US011252391B2

(12) United States Patent
Cole et al.

(10) Patent No.: US 11,252,391 B2
(45) Date of Patent: Feb. 15, 2022

(54) METHODS AND APPARATUS FOR PACKING IMAGES INTO A FRAME AND/OR INCLUDING ADDITIONAL CONTENT OR GRAPHICS

(71) Applicant: Nevermind Capital LLC, Wilmington, DE (US)

(72) Inventors: David Cole, Aliso Viejo, CA (US); Alan McKay Moss, Laguna Beach, CA (US); Hector M. Medina, Laguna Beach, CA (US); Ryan Michael Sheridan, Rancho Cucamonga, CA (US)

(73) Assignee: Nevermind Capital LLC, Wilmington, DE (US)

( * ) Notice: Subject to any disclaimer, the term of this patent is extended or adjusted under 35 U.S.C. 154(b) by 0 days.

(21) Appl. No.: 15/921,373

(22) Filed: Mar. 14, 2018

(65) Prior Publication Data

US 2018/0255288 A1 Sep. 6, 2018

Related U.S. Application Data

(63) Continuation of application No. PCT/US2018/021238, filed on Mar. 6, 2018.
(Continued)

(51) Int. Cl.
*H04N 13/161* (2018.01)
*H04N 7/18* (2006.01)
(Continued)

(52) U.S. Cl.
CPC .......... *H04N 13/161* (2018.05); *H04N 7/181* (2013.01); *H04N 13/156* (2018.05);
(Continued)

(58) Field of Classification Search
None
See application file for complete search history.

(56) References Cited

U.S. PATENT DOCUMENTS 6,108,005 A 8/2000 Starks et al.
6,304,284 B1 10/2001 Dunton et al.
(Continued)

OTHER PUBLICATIONS

Notification of Transmittal of the International Search Report and the Written Opinion of the International Searching Authority, or the Declaration with the International Search Report and the Written Opinion of the Searching Authority dated May 29, 2018, pp. 1-9.

*Primary Examiner* — Clifford Hilaire
(74) *Attorney, Agent, or Firm* — Blank Rome LLP

(57) ABSTRACT

Methods and apparatus for packing images into a frame and/or including additional content and/or graphics are described. A composite image is generated including at least one image in addition to another image and/or additional image content, e.g., a logo, texture, sign, or advertisement. In some embodiments, first and second pairs of stereoscopic images are combined, e.g., with additional image content to generate a composite image which is then encoded, e.g., using a UHD (Ultra High Definition) encoder. In some other embodiments, the rather than two pairs of stereo images a pair of stereo images are combined with images captured by two mono cameras. In various embodiments, the set of cameras which are sources of captured images for the composite image are dynamically selected, e.g., with different sets of cameras in a camera rig being selected at different times.

20 Claims, 13 Drawing Sheets

Related U.S. Application Data

(60) Provisional application No. 62/467,813, filed on Mar. 6, 2017.

(51) Int. Cl.
*H04N 13/178* (2018.01)
*H04N 13/156* (2018.01)
*H04N 21/81* (2011.01)
*H04N 21/414* (2011.01)
*H04N 21/4728* (2011.01)

(52) U.S. Cl.
CPC ........ *H04N 13/178* (2018.05); *H04N 21/414* (2013.01); *H04N 21/4728* (2013.01); *H04N 21/816* (2013.01)

(56) References Cited

U.S. PATENT DOCUMENTS

| | | | |
|---|---|---|---|
| 6,417,969 B1* | 7/2002 | DeLuca | G02B 27/2235 |
| | | | 359/630 |
| 8,451,320 B1 | 5/2013 | Cole et al. | |
| 8,610,757 B2 | 12/2013 | Cole et al. | |
| 9,204,127 B1 | 12/2015 | Cole et al. | |
| 9,313,474 B1 | 4/2016 | Cole et al. | |
| 9,407,902 B1 | 8/2016 | Cole et al. | |
| 9,485,494 B1 | 11/2016 | Cole et al. | |
| 9,538,160 B1 | 1/2017 | Cole | |
| 9,699,437 B2 | 7/2017 | Cole et al. | |
| 9,729,850 B2 | 8/2017 | Cole et al. | |
| 9,821,920 B2 | 11/2017 | Cole et al. | |
| 9,832,449 B2 | 11/2017 | Cole et al. | |
| 9,832,450 B2 | 11/2017 | Cole et al. | |
| 9,836,845 B2 | 12/2017 | Cole et al. | |
| 9,865,055 B2 | 1/2018 | Cole et al. | |
| 9,894,350 B2 | 2/2018 | Cole et al. | |
| 9,912,965 B2 | 3/2018 | Cole et al. | |
| 9,918,136 B2 | 3/2018 | Cole et al. | |
| 9,930,318 B2 | 3/2018 | Cole et al. | |
| 9,955,147 B2 | 4/2018 | Cole et al. | |
| 2009/0091612 A1* | 4/2009 | Sekizawa | G03B 35/18 |
| | | | 348/43 |
| 2014/0184496 A1 | 7/2014 | Gribetz et al. | |
| 2015/0341617 A1 | 11/2015 | Cole et al. | |
| 2015/0346812 A1* | 12/2015 | Cole | H04N 19/597 |
| | | | 345/156 |
| 2015/0346832 A1 | 12/2015 | Cole et al. | |
| 2016/0065946 A1 | 3/2016 | Cole et al. | |
| 2016/0065947 A1 | 3/2016 | Cole et al. | |
| 2016/0080728 A1 | 3/2016 | Cole et al. | |
| 2016/0088287 A1 | 3/2016 | Sadi et al. | |
| 2016/0134810 A1* | 5/2016 | Morofuji | H04N 5/23238 |
| | | | 348/36 |
| 2016/0212403 A1 | 7/2016 | Cole et al. | |
| 2016/0212409 A1 | 7/2016 | Cole et al. | |
| 2016/0219262 A1 | 7/2016 | Cole et al. | |
| 2016/0219305 A1 | 7/2016 | Cole et al. | |
| 2016/0227190 A1 | 8/2016 | Cole et al. | |
| 2016/0239978 A1 | 8/2016 | Cole et al. | |
| 2016/0241836 A1 | 8/2016 | Cole et al. | |
| 2016/0241837 A1 | 8/2016 | Cole et al. | |
| 2016/0241838 A1 | 8/2016 | Cole et al. | |
| 2016/0241892 A1 | 8/2016 | Cole et al. | |
| 2016/0253795 A1 | 9/2016 | Cole et al. | |
| 2016/0253809 A1 | 9/2016 | Cole et al. | |
| 2016/0253810 A1 | 9/2016 | Cole et al. | |
| 2016/0253839 A1 | 9/2016 | Cole et al. | |
| 2016/0255326 A1 | 9/2016 | Cole et al. | |
| 2016/0255327 A1 | 9/2016 | Cole et al. | |
| 2016/0269716 A1 | 9/2016 | Cole et al. | |
| 2016/0360104 A1 | 12/2016 | Zhang et al. | |
| 2016/0360180 A1 | 12/2016 | Cole et al. | |
| 2016/0366392 A1 | 12/2016 | Raghoebardajal et al. | |
| 2016/0373734 A1 | 12/2016 | Cole et al. | |
| 2017/0050743 A1 | 2/2017 | Cole et al. | |
| 2017/0061600 A1 | 3/2017 | Cole et al. | |
| 2017/0061693 A1* | 3/2017 | Kohler | G06T 19/006 |
| 2017/0070674 A1 | 3/2017 | Thurow et al. | |
| 2017/0094247 A1 | 3/2017 | Cole et al. | |
| 2017/0126972 A1 | 5/2017 | Evans et al. | |
| 2017/0150122 A1 | 5/2017 | Cole | |
| 2017/0155967 A1* | 6/2017 | Chang | H04N 21/2187 |
| 2017/0228933 A1 | 8/2017 | Li et al. | |
| 2017/0324945 A1 | 11/2017 | Cole et al. | |
| 2017/0359564 A1 | 12/2017 | Cole et al. | |
| 2018/0018932 A1* | 1/2018 | Atkins | G09G 5/026 |
| 2018/0020206 A1 | 1/2018 | Sheridan | |
| 2018/0024419 A1 | 1/2018 | Sheridan | |
| 2018/0027152 A1 | 1/2018 | Sheridan | |

\* cited by examiner

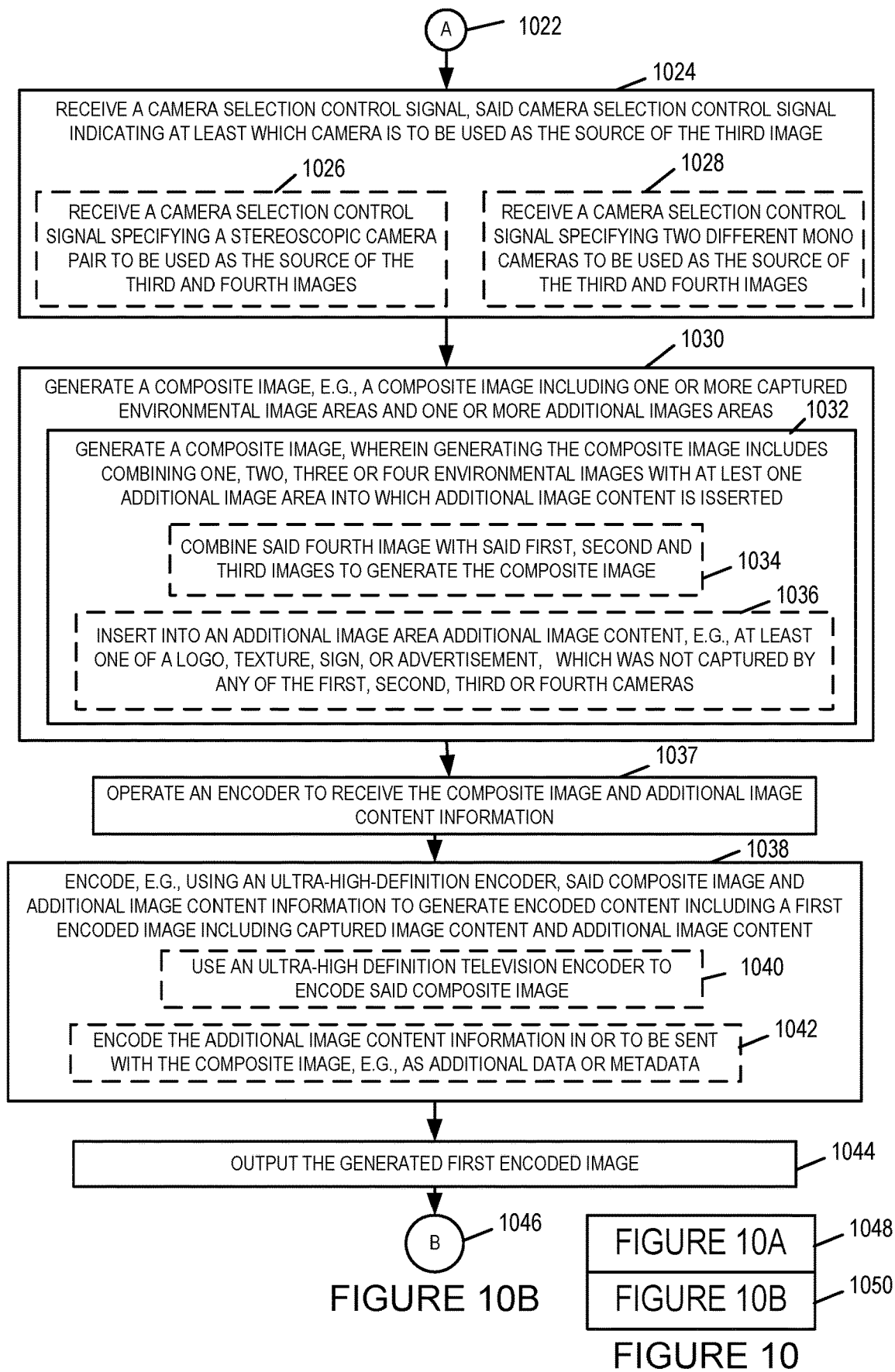

METHODS AND APPARATUS FOR PACKING IMAGES INTO A FRAME AND/OR INCLUDING ADDITIONAL CONTENT OR GRAPHICS

RELATED APPLICATIONS

The present application is a continuation of PCT Application PCT/US18/21238 filed Mar. 6, 2018 which claims the benefit of U.S. Provisional Patent Application Ser. No. 62/467,813, filed Mar. 6, 2017 each of which is hereby expressly incorporated by reference in its entirety.

FIELD

The present invention relates to methods and apparatus for capturing, streaming and/or playback of content, e.g., content which can be used to simulate an environment.

BACKGROUND

Display devices which are intended to provide an immersive experience normally allow a user to turn his head and experience a corresponding change in the scene which is displayed. Head mounted displays sometimes support 360 degree viewing in that a user can turn around while wearing a head mounted display with the scene being displayed changing as the user's head position is changes.

In order to support 360 degrees of view, a 360 degree scene may be captured using multiple cameras, e.g., with multiple stereoscopic camera pairs or individual mono cameras, with the images being combined to generate the 360 degree scene which is to be made available for viewing.

Given transmission the constraints, e.g., network data constraints, associated with content being streamed, it may not be possible to stream the full 360 degree view in full high definition video to all customers seeking to receive and interact with the content. This is particularly the case where the content is stereoscopic content including image content intended to correspond to left and right eye views to allow for a 3D viewing effect.

In the case of stereoscopic camera rigs, wide angle lenses, e.g., fisheye camera lenses, may be used to capture a wide viewing area.

While fisheye lenses may capture a wide viewing area, the captured image may only occupy a portion of a frame due to the way a fisheye lens directs light onto a sensor. This can result in portions of a frame being encoded with no useful image content when the captured images are encoded as they are and sent to a playback device.

Efficient use of available bandwidth is a technical problem that remains to be addressed. This is particularly the case where fish eye lenses are used to capture images to be communicated. Given the limited bandwidth available for communicating content to a playback device it would be desirable if methods and/or apparatus could be developed which could efficiently communicate images and/or other content to a playback device without wasting bandwidth that might normally be used to communicate blank portions of a frame that is used to communicate an image captured using a fisheye lens.

As part of making efficient use of available bandwidth used to communicate a frame, it would be desirable if in at least some embodiments portions of a frame could be used to communicate additional image content, e.g., content captured by a different camera than the camera used to capture an image communicated in a large portion of the frame and content that is provided by another source of image content. In addition, while not necessary for all embodiments it would be desirable if at least some embodiments could be implemented using standard encoders and/or if at least some embodiments allowed for information about additional content or its use to be communicated to a playback device.

In view of the above discussion it should be appreciated that there is a need for methods and apparatus for receiving, transmitting and/or processing image content from one or more cameras. It would be desirable if graphics or additional content could be included with images in at least some embodiments.

SUMMARY

Methods and apparatus for packing one or more images into a frame and/or including additional image content, e.g., a captured image, text, ad, and/or graphics are described. Various described methods and apparatus are well suited for use in systems including a stereoscopic camera pair and including a HD encoder or an ultra HD encoder but the methods and apparatus are not limited to such embodiments.

A first exemplary method comprises: receiving a first image captured by a first camera using a first fish eye lens; and generating a composite image by combining a portion of the first image with additional image content; and operating an encoder to: i) receive the composite image and additional image content information; and ii) generate (1038) encoded content including a first encoded composite frame and said additional image content information.

An exemplary system implemented in some but not necessarily all embodiments comprises: a receiver for receiving a first image captured by a first camera using a first fish eye lens; and a compositor for generating a composite image by combining a portion of the first image with additional image content; and an encoder configured to: i) receive the composite image and additional image content information; and ii) generate encoded content including a first encoded composite frame and said additional image content information.

Another exemplary method, in accordance with some embodiments, comprises: receiving a first pair of images captured by a first stereoscopic camera pair, said first pair of images including at least a first image captured by a first camera and a second image captured by a second camera, said first camera being a left camera of said first stereoscopic camera pair, said second camera being a right camera of said first stereoscopic camera pair; receiving one or more additional images captured by one or more additional cameras; generating a composite image by combining said first and second with at least a third image to form a composite image, said third image being one of said one or more additional images; and encoding said composite image to generate a first encoded image including image content from said first, second and third images.

In some embodiments, the generated composite image is generated from four captured images corresponding to left and right cameras of two stereoscopic camera pairs and optionally includes additional image content. In some embodiments, the generated composite image is generated from four captured images corresponding to one stereoscopic camera pair and two mono cameras, and optionally includes additional image content. In various embodiments, the additional image content, e.g., a logo, texture, sign, text, an advertisement, etc., is inserted into an additional image content area, e.g., an area in which captured image content is not stored or located. In various embodiments, the cameras to be used as captured image input sources for a composite image to be generated are selected. For example, in one embodiment, a camera rig includes 3 stereoscopic camera pairs and 2 of the stereoscopic camera pairs are selected to be used as input sources for a particular composite image. In some such embodiments, at different times different cameras may be, and sometimes are, selected to be used as input sources for the composite images.

While various features have been mentioned in combination with regard to some exemplary embodiments in this summary the mention of a combination of features is not intended to indicate that such a combination of features or other features mentioned in this summary are required for, or necessary for, all embodiments.

In various embodiments, additional image content control information which controls the use of the additional image content during the rendering of an image using the image data included in the composite frame is encoded in or with the composite image, e.g., as metadata.

While various embodiments have been discussed in the summary above, it should be appreciated that not necessarily all embodiments include the same features and some of the features described above are not necessary for all embodiments. Numerous additional features, embodiments and benefits of various embodiments are discussed in the detailed description which follows.

BRIEF DESCRIPTION OF THE FIGURES

FIG. 10B is a second part of flowchart of an exemplary method of receiving and processing captured images in accordance with an exemplary embodiment.

FIG. 10 comprises the combination of FIG. 10A and FIG. 10B.

DETAILED DESCRIPTION

Figure 1:
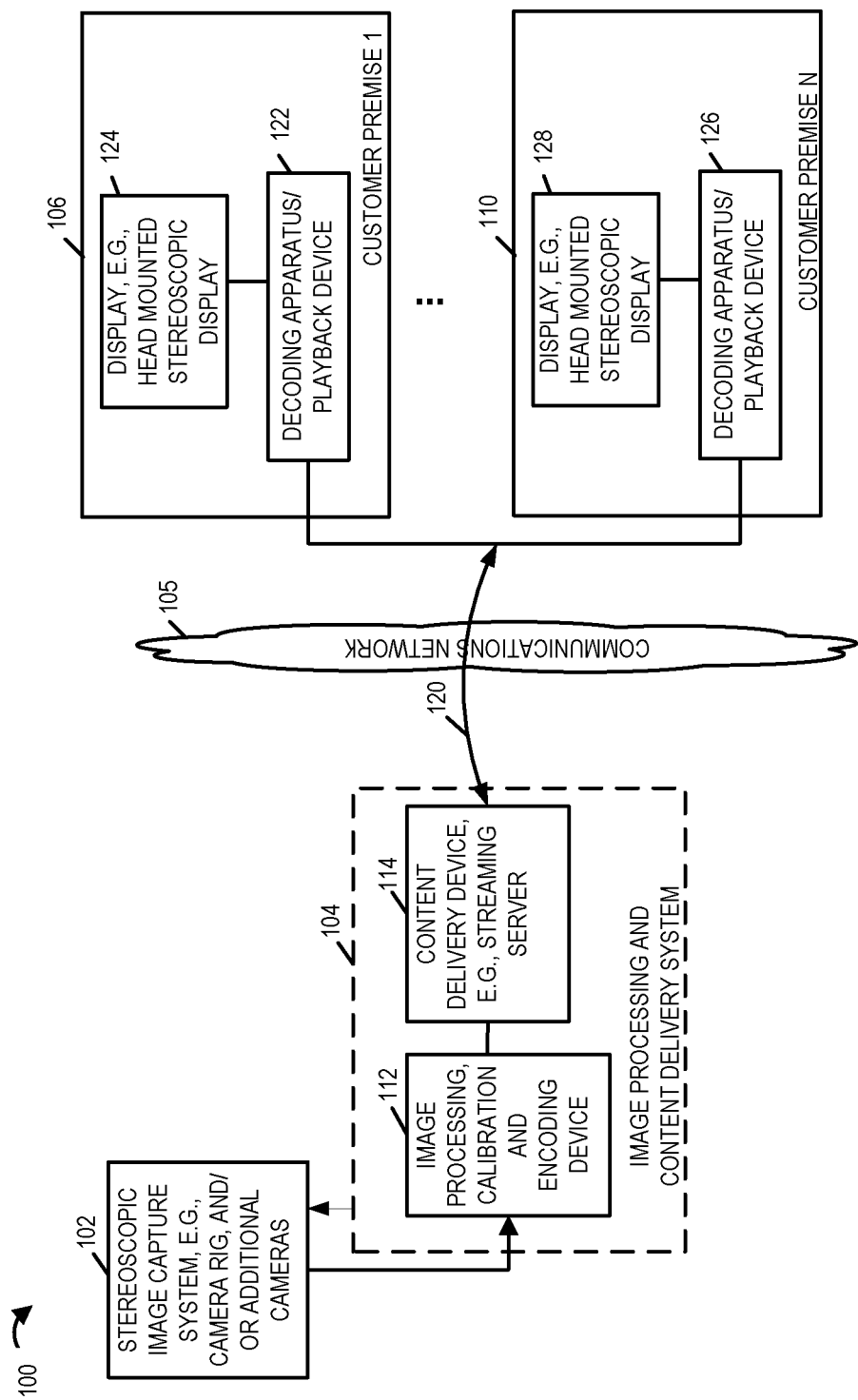
FIG. 1 illustrates an exemplary system implemented in accordance with some embodiments of the invention which can be used to capture, stream content, and output content to one or more users along in a synthesized environment.

FIG. 1 illustrates an exemplary system 100 implemented in accordance with some embodiments of the invention. The system 100 supports content delivery, e.g., imaging content delivery, to one or more customer devices, e.g., playback devices/content players, located at customer premises. The system 100 includes the exemplary image capturing device 102, a content delivery system 104, a communications network 105, and a plurality of customer premises 106, . . . , 110. The image capturing device 102 supports capturing of stereoscopic imagery. The image capturing device 102 captures and processes imaging content in accordance with the features of the invention. The communications network 105 may be, e.g., a hybrid fiber-coaxial (HFC) network, satellite network, and/or internet.

The content delivery system 104 includes an image processing, calibration and encoding apparatus 112 and a content delivery device, e.g. a streaming server 114. The image processing, calibration and encoding apparatus 112 is responsible for performing a variety of functions including camera calibration based on one or more target images and/or grid patterns captured during a camera calibration process, generation of a distortion correction or compensation mesh which can be used by a playback device to compensate for distortions introduced by a calibrated camera, processing, e.g., cropping and encoding of captured images, and supplying calibration and/or environmental information to the content delivery device 114 which can be supplied to a playback device and used in the rendering/image playback process. Content delivery device 114 may be implemented as a server with, as will be discussed below, the delivery device responding to requests for content with image calibration information, optional environment information, and one or more images captured by the camera rig 102 which can be used in simulating a 3D environment. Streaming of images and/or content maybe and sometimes is a function of feedback information such as viewer head position and/or user selection of a position at the event corresponding to a camera right 102 which is to be the source of the images. For example, a user may select or switch between images from a camera rig positioned at center line to a camera rig positioned at the field goal with the simulated 3D environment and streamed images being changed to those corresponding to the user selected camera rig. Thus it should be appreciated that a single camera rig 102 is shown in FIG. 1 multiple camera rigs may be present in the system and located at different physical locations at a sporting or other event with the user being able to switch between the different positions and with the user selections being communicated from the playback device 122 to the content server 114. While separate devices 112, 114 are shown in the image processing and content delivery system 104, it should be appreciated that the system may be implemented as a single device including separate hardware for performing the various functions or with different functions being controlled by different software or hardware modules but being implemented in or on a single processor.

The encoding apparatus 112 may, and in some embodiments does, include one or a plurality of encoders for encoding image data in accordance with the invention. The encoders may be used in parallel to encode different portions of a scene and/or to encode a given portion of a scene to generate encoded versions which have different data rates. Using multiple encoders in parallel can be particularly useful when real time or near real time streaming is to be supported.

The content streaming device 114 is configured to stream, e.g., transmit, encoded content for delivering the encoded image content to one or more customer devices, e.g., over the communications network 105. Via the network 105, the content delivery system 104 can send and/or exchange information with the devices located at the customer premises 106, 110 as represented in the figure by the link 120 traversing the communications network 105.

While the encoding apparatus 112 and content delivery server are shown as separate physical devices in the FIG. 1 example, in some embodiments they are implemented as a single device which encodes and streams content. The encoding process may be a 3d, e.g., stereoscopic, image encoding process where information corresponding to left and right eye views of a scene portion are encoded and included in the encoded image data so that 3D image viewing can be supported. The particular encoding method used is not critical to the present application and a wide range of encoders may be used as or to implement the encoding apparatus 112.

Each customer premise 106, 110 may include a plurality of devices/players, e.g., decoding apparatus to decode and playback/display the imaging content streamed by the content streaming device 114. Customer premise 1 106 includes a decoding apparatus/playback device 122 coupled to a display device 124 while customer premise N 110 includes a decoding apparatus/playback device 126 coupled to a display device 128. In some embodiments the display devices 124, 128 are head mounted stereoscopic display devices.

In various embodiments decoding apparatus 122, 126 present the imaging content on the corresponding display devices 124, 128. The decoding apparatus/players 122, 126 may be devices which are capable of decoding the imaging content received from the content delivery system 104, generate imaging content using the decoded content and rendering the imaging content, e.g., 3D image content, on the display devices 124, 128. Any of the decoding apparatus/playback devices 122, 126 may be used as the decoding apparatus/playback device 800 shown in FIG. 4. A system/playback device such as the one illustrated in FIG. 4 can be used as any of the decoding apparatus/playback devices 122, 126.

Figure 2:
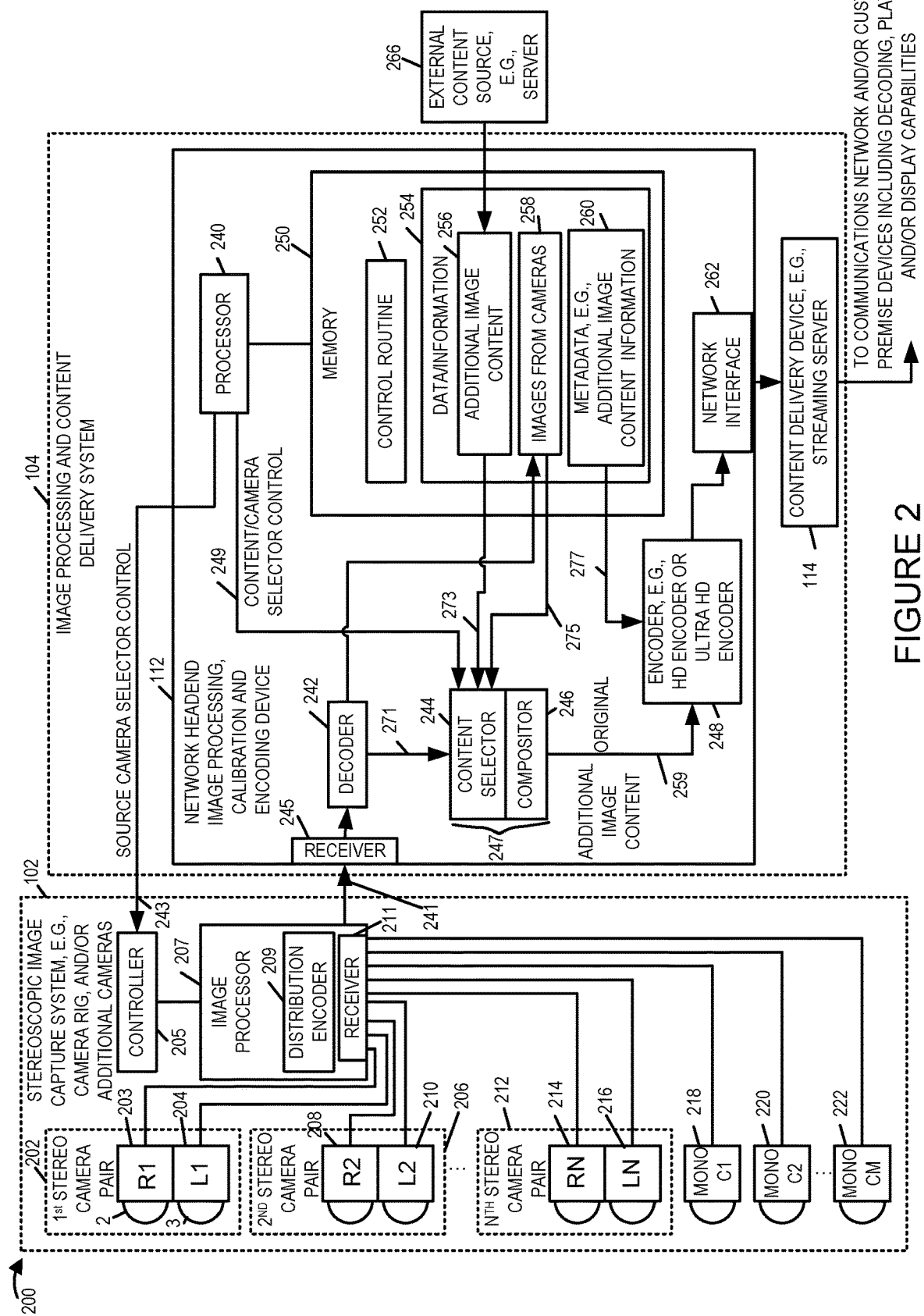
FIG. 2 illustrates the exemplary image capture system and the exemplary image processing and content delivery system of FIG. 1 in more detail in accordance with an exemplary embodiment.

FIG. 2 is a drawing 200 the illustrates the exemplary image capture system 102 and the exemplary image processing and content delivery system 104 of FIG. 1 in more detail in accordance with an exemplary embodiment. Drawing 200 of FIG. 2 further illustrates an external content source, e.g., a server 266, which can and sometimes is incorporated into a frame that includes a captured image of a portion of an environment as will be discussed further below with regard to FIG. 8 for example. The server 266 may be and sometimes is, the source of additional image content to be included in a composite image. The additional image content may be a wide variety of different types of content such as billboard score information, advertisements or content by a different camera than that of a main image included in a frame. The stereoscopic image capture system 102 of the system 200 can and often does include a plurality of stereoscopic camera pairs, e.g., first stereo camera pair 202, second stereo camera pair 206, Nth stereo camera pair 212. Each of the stereo camera pairs 202, 208, 212 includes a pair of left and right cameras (204, 203), (210, 208) and (216, 214). The left and right cameras capture left and right eye images of a portion of an environment at which the cameras of an individual camera pair are directed. By orienting different camera pairs in different directions a 360 degree image capture around the camera system is achieved in some embodiments. In addition to the stereo camera pairs (202, 206, 212) the image capture system 102 includes a plurality of mono cameras C1 218, C2 220, to camera CM 222. The mono cameras may be used in place of or in addition to the stereo camera pairs. For example mono image capture may be used for the ground and/or sky which may be of lower priority in some embodiments than in others. The left and right cameras of the stereo camera pairs 202, 206, 212 and the mono cameras 218, 220, 222 may and in at least some embodiments do use fish eye lenses which can capture a wide field of view. While fisheye lenses capture a wide field of view the capture image of the environment often only occupies a central portion of an image sensor, e.g., a circular center portion. Consider for example the captured image portion by a camera may only occupy the area 504 with the additional image area 502 available in a frame going to waste since light from the fisheye lens, used in some embodiments, is directed to the center portion of the sensor and not the edge portions.

Images captured by the cameras of the image capture system 102 are supplied to an image processor 207 which includes a receiver 211 and a distribution encoder 209. The receiver 211 receives captured images from the various cameras being used in the set of cameras (203, 204, 208, 210, 214, 216, 218, 220, . . . 222). The distribution encoder 209 encodes the captured images from the various cameras being used and then transmits them to the image processing and content delivery system 104 as represented by the arrow 241. While the image processing system 207 may encode and communicate the content from all cameras to the image processing and content delivery system 104 on an ongoing basis, due to bandwidth constraints it may be desirable to communicate a limited number of camera feeds at a given time. Controller 205 is coupled via line 243 to a processor 240 of the image processing system 104 and is connected to the image processor 207. The controller 205 can and sometimes does receive a source camera selector control signal via line 243 which it then responds to by controlling the image processor 207 to encode and send selected camera feeds, e.g., captured images from one or more stereo camera pairs and/or mono cameras to the image processing system 104 in encoded format.

The image processing and content delivery system 104 includes, in addition to processor 240, a receiver 245, a decoder 242, content selector and compositor device 247, an encoder 248 memory 250 and network interface 262. The processor 240 controls operation of the image processing and content delivery system and also sends source camera selector control signals to the image capture system 102, via line 243, to control which camera feeds are provided to the image processing sand content delivery system for processing at a given time. The processor 240 is coupled to the memory 250 and also to the content selector 244 of the content selector and compositor device 247. Processor 240, sends content selector control signal 249 to content selector 244, content selector 244 receives the content selector control signal 249. In this way the processor 240 can and does control the supply of image content from memory 250 to the content selector 244 which supplies the content to the compositor portion 246 of the content selector and compositor device 247. The compositor 246 will combine images from one or more cameras and/or additional image content to generate a frame which is then encoded along with corresponding metadata by encoder 248. A single captured image frame may be combined with additional image content, e.g., with the additional image content being placed in a location of a frame which does not include the captured portion of the environment captured using a fish eye lens. The additional content may be a portion of an image captured by another one of the cameras 218, 220, 222 or a camera of a camera pair, content such as a score to be displayed on a billboard and/or an advertisement for example. While individual frames may be encoded separately, in some embodiments multiple frames, including a captured image of the environment and/or additional image content, may be and sometimes are combined into a single HD or UHD frame, as will be explained further below, which is then encoded as a single frame by the encoder 248. Since the compositing is done by compositor 246 from the perspective of the encoder 248 it receives and encodes a sequence of individual frames which may or may not be composite frames. The encoder 248 can be and sometimes is an MPEG HD or Ultra HD video encoder but any of a wide variety of encoders 248 could be used.

The memory 250 which is coupled to processor 240 includes a control routine 252 which when executed by the processor 240 causes the processor 240 to control the image processing and content delivery system 104 to implement the methods of the present invention. Memory 250 stores additional image content 256 received from external content source 266 and supplies it under control fo the processor 240 to content selector 244 for inclusion in one or more frames which are to be generated and output form the compositor. The memory 250 also stores images 258 from the cameras of the image capture system which are obtained from the decoder 242 which decodes the encoded images provided by the image capture system and stores them in memory 250. The content selector and compositor 247 receives additional image content and images from the cameras and generates, under direction of processor 240, composite frames there from which are then supplied by the compositor 246 to the encoder 248. Memory 250 also includes metadata 260 which is supplied to the encoder 248 for encoding and communication with encoded frames to which the metadata relates. The metadata may indicate, for example, how additional image content is to be used during rendering to generate an image to be displayed to a user and may identify one or more UV maps and/or mesh models to be used for a particular image that is generated by the encoder and/or mesh correction information to be used when rendering an output image from encoded image content. The metadata may and sometimes does indicate how captured images and/or additional image content has been packaged into an encoded frame thereby providing a playback device information on how to recover various image portions from an encoded frame so that the image content can be used as textures during image rendering. As part of the rendering processes portions of a frame are applied to a model or models as textures and the resulting image is then displayed. Additional image content communicated in a portion of a frame which might go unused since it is not used to communicate image content captured by a fish eye lens, e.g., a corner portion of a frame, maybe and sometimes is combined with image content captured by a fish eye lens and communicated in a frame. In this way what might otherwise be wasted frame portions is used in an efficient manner with additional content being communicated in the same frame including a captured image of a portion of an environment with which the additional image content is to be combined.

Encoded image frames generated by the encoder 248 which may and often will include additional image content and corresponding metadata, are output by the encoder 248 and supplied via network interface 262 to the content delivery device 114 for delivery, e.g., streaming, to one or more playback devices via a communications network.

Figure 3:
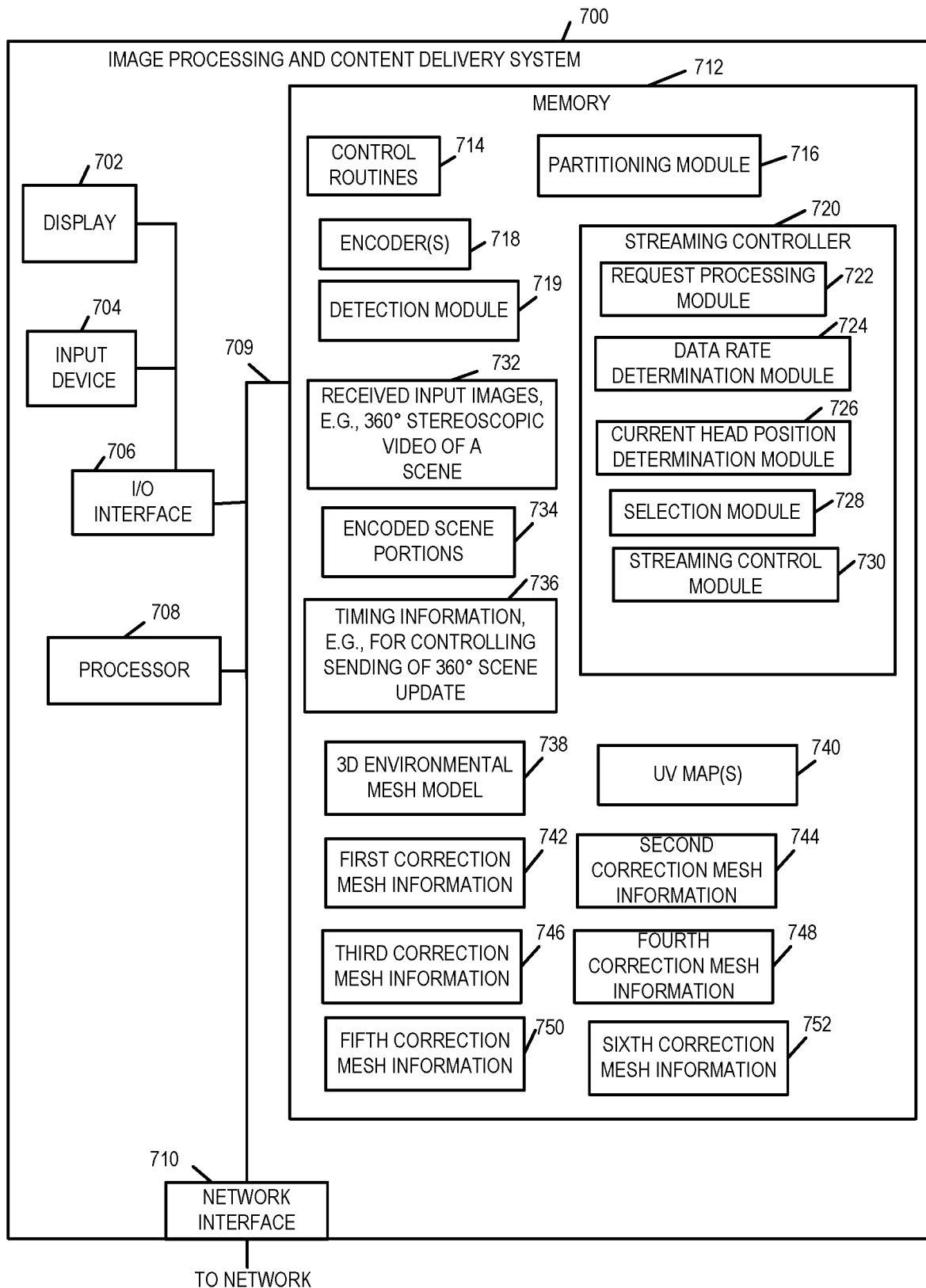
FIG. 3 illustrates an exemplary content delivery system encoding capability that can be used to encode and stream content in accordance with the features of the invention.

FIG. 3 illustrates an exemplary image processing and content delivery system 700 with encoding capability that can be used to encode and stream content in accordance with the features of the invention.

The system may be used to perform encoding, storage, and transmission and/or content output in accordance with the features of the invention. In some embodiments the system 700 or the elements therein perform the operation corresponding to the process illustrated in FIG. 6 and FIG. 23. The image processing and content delivery system 700 may be used as the system 104 of FIG. 1. While the system shown in FIG. 3 is used for encoding, processing and streaming of content, it should be appreciated that the system 700 may also include the ability to decode and display processed and/or encoded image data, e.g., to an operator.

The system 700 includes a display 702, input device 704, input/output (I/O) interface 706, a processor 708, network interface 710 and a memory 712. The various components of the system 700 are coupled together via bus 709 which allows for data to be communicated between the components of the system 700.

The memory 712 includes various modules, e.g., routines, which when executed by the processor 708 control the system 700 to implement the partitioning, encoding, storage, and streaming/transmission and/or output operations in accordance with the invention.

The memory 712 includes various modules, e.g., routines, which when executed by the processor 707 control the computer system 700 to implement the immersive stereoscopic video acquisition, encoding, storage, and transmission and/or output methods in accordance with the invention. The memory 712 includes control routines 714, a partitioning module 706, encoder(s) 718, a detection module 719, a streaming controller 720, received input images 732, e.g., 360 degree stereoscopic video of a scene, encoded scene portions 734, timing information 736, an environmental mesh model 738, UV maps(s) 740 and a plurality of correction mesh information sets including first correction mesh information 742, second correction mesh information 744, third correction mesh information 746, fourth correction mesh information 748, fifth correction mesh information 750 and sixth correction mesh information 752. In some embodiments the modules are, implemented as software modules. In other embodiments the modules are implemented in hardware, e.g., as individual circuits with each module being implemented as a circuit for performing the function to which the module corresponds. In still other embodiments the modules are implemented using a combination of software and hardware.

The control routines 714 include device control routines and communications routines to control the operation of the system 700. The partitioning module 716 is configured to partition a received stereoscopic 360 degree version of a scene into N scene portions in accordance with the features of the invention.

The encoder(s) 718 may, and in some embodiments do, include a plurality of encoders configured to encode received image content, e.g., 360 degree version of a scene and/or one or more scene portions in accordance with the features of the invention. In some embodiments encoder(s) include multiple encoders with each encoder being configured to encode a stereoscopic scene and/or partitioned scene portions to support a given bit rate stream. Thus in some embodiments each scene portion can be encoded using multiple encoders to support multiple different bit rate streams for each scene. An output of the encoder(s) 718 is the encoded scene portions 734 which are stored in the memory for streaming to customer devices, e.g., playback devices. The encoded content can be streamed to one or multiple different devices via the network interface 710.

The detection module 719 is configured to detect a network controlled switch from streaming content from a current camera pair, e.g., first stereoscopic camera pair, to another camera pair, e.g., a second or third stereoscopic camera pair. That is the detection module 719 detects if the system 700 has switched from streaming content stream generated using images captured by a given stereoscopic camera pair, e.g., a first stereoscopic camera pair, to streaming content stream generated using images captured by another camera pair. In some embodiments the detection module is further configured to detect a user controlled change from receiving a first content stream including content from the first stereoscopic camera pair to receiving a second content stream including content from the second stereoscopic camera pair, e.g., detecting a signal from user playback device indicating that the playback device is attached to a different content stream than a content to which it was attached previously. The streaming controller 720 is configured to control streaming of encoded content for delivering the encoded image content to one or more customer devices, e.g., over the communications network 105. In various embodiments various steps of the flowchart 600 and/or flowchart 2300 are implemented by the elements of the streaming controller 720.

The streaming controller 720 includes a request processing module 722, a data rate determination module 724, a current head position determination module 726, a selection module 728 and a streaming control module 730. The request processing module 722 is configured to process a received request for imaging content from a customer playback device. The request for content is received in various embodiments via a receiver in the network interface 710. In some embodiments the request for content includes information indicating the identity of requesting playback device. In some embodiments the request for content may include data rate supported by the customer playback device, a current head position of the user, e.g., position of the head mounted display. The request processing module 722 processes the received request and provides retrieved information to other elements of the streaming controller 720 to take further actions. While the request for content may include data rate information and current head position information, in various embodiments the data rate supported by the playback device can be determined from network tests and other network information exchange between the system 700 and the playback device.

The data rate determination module 724 is configured to determine the available data rates that can be used to stream imaging content to customer devices, e.g., since multiple encoded scene portions are supported the content delivery system 700 can support streaming content at multiple data rates to the customer device. The data rate determination module 724 is further configured to determine the data rate supported by a playback device requesting content from system 700. In some embodiments the data rate determination module 724 is configured to determine available data rate for delivery of image content based on network measurements.

The current head position determination module 726 is configured to determine a current viewing angle and/or a current head position of the user, e.g., position of the head mounted display, from information received from the playback device. In some embodiments the playback device periodically sends current head position information to the system 700 where the current head position determination module 726 receives ad processes the information to determine the current viewing angle and/or a current head position.

The selection module 728 is configured to determine which portions of a 360 degree scene to stream to a playback device based on the current viewing angle/head position information of the user. The selection module 728 is further configured to select the encoded versions of the determined scene portions based on available data rate to support streaming of content.

The streaming control module 730 is configured to control streaming of image content, e.g., multiple portions of a 360 degree stereoscopic scene, at various supported data rates in accordance with the features of the invention. In some embodiments the streaming control module 730 is configured to control stream N portions of a 360 degree stereoscopic scene to the playback device requesting content to initialize scene memory in the playback device. In various embodiments the streaming control module 730 is configured to send the selected encoded versions of the determined scene portions periodically, e.g., at a determined rate. In some embodiments the streaming control module 730 is further configured to send 360 degree scene update to the playback device in accordance with a time interval, e.g., once every minute. In some embodiments sending 360 degree scene update includes sending N scene portions or N-X scene portions of the full 360 degree stereoscopic scene, where N is the total number of portions into which the full 360 degree stereoscopic scene has been partitioned and X represents the selected scene portions recently sent to the playback device. In some embodiments the streaming control module 730 waits for a predetermined time after initially sending N scene portions for initialization before sending the 360 degree scene update. In some embodiments the timing information to control sending of the 360 degree scene update is included in the timing information 736. In some embodiments the streaming control module 730 is further configured identify scene portions which have not been transmitted to the playback device during a refresh interval; and transmit an updated version of the identified scene portions which were not transmitted to the playback device during the refresh interval.

In various embodiments the streaming control module 730 is configured to communicate at least a sufficient number of the N portions to the playback device on a periodic basis to allow the playback device to fully refresh a 360 degree version of said scene at least once during each refresh period.

In some embodiments streaming controller 720 is configured to control the system 700 to transmit, e.g., via a transmitter in the network interface 710, a stereoscopic content stream (e.g., encoded content stream 734) including encoded images generated from image content captured by one or more cameras, e.g., cameras of stereoscopic camera pairs such as illustrated in FIG. 13. In some embodiments streaming controller 720 is configured to control the system 700 to transmit, to one or more playback devices, an environmental mesh model 738 to be used in rendering image content. In some embodiments streaming controller 720 is further configured to transmit to a playback device a first UV map to be used for mapping portions of images captured by a first stereoscopic camera pair to a portion of the environmental mesh model as part of a image rendering operation.

In various embodiments the streaming controller 720 is further configured to provide (e.g., transmit via a transmitter in the network interface 710) one or more sets of correction mesh information, e.g., first, second, third, fourth, fifth, sixth, correction mesh information to a playback device. In some embodiments the first correction mesh information is for use in rendering image content captured by a first camera of a first stereoscopic camera pair, the second correction mesh information is for use in rendering image content captured by a second camera of the first stereoscopic camera pair, the third correction mesh information is for use in rendering image content captured by a first camera of a second stereoscopic camera pair, the fourth correction mesh information is for use in rendering image content captured by a second camera of the second stereoscopic camera pair, the fifth correction mesh information is for use in rendering image content captured by a first camera of a third stereoscopic camera pair, the sixth correction mesh information is for use in rendering image content captured by a second camera of the third stereoscopic camera pair. In some embodiments the streaming controller 720 is further configured to indicate, e.g., by sending a control signal, to the playback device that the third and fourth correction mesh information should be used when content captured by the second stereoscopic camera pair is streamed to the playback device instead of content from the first stereoscopic camera pair. In some embodiments the streaming controller 720 is further configured to indicate to the playback device that the third and fourth correction mesh information should be used in response to the detection module 719 detecting i) a network controlled switch from streaming content from said first stereoscopic camera pair to said second stereoscopic pair or ii) a user controlled change from receiving a first content stream including content from said first stereoscopic camera pair to receiving a second content stream including encoded content from the second stereoscopic camera pair.

The memory 712 further includes the environmental mesh model 738, UV map(s) 740, and sets of correction mesh information including first correction mesh information 742, second correction mesh information 744, third correction mesh information 746, fourth correction mesh information 748, fifth correction mesh information 750 and sixth correction mesh information 752. The system provides the environmental mesh model 738 to one or more playback devices for use in rendering image content. The UV map(s) 740 include at least a first UV map to be used for mapping portions of images captured by the first stereoscopic camera pair to a portion of the environmental mesh model 738 as part of a image rendering operation. The first correction mesh information 742 includes information generated based on measurement of one or more optical characteristics of a first lens of said first camera of the first stereoscopic camera pair and the second correction mesh includes information generated based on measurement of one or more optical characteristic of a second lens of said second camera of the first stereoscopic camera pair. In some embodiments the first and second stereoscopic camera pairs correspond to a forward viewing direction but different locations at an area or event location where content is being captured for streaming.

In some embodiments the processor 708 is configured to perform the various functions corresponding to the steps discussed in flowcharts 600 and/or 2300. In some embodiments the processor uses routines and information stored in memory to perform various functions and control the system 700 to operate in accordance with the methods of the present invention. In one embodiments the processor 708 is configured to control the system to provide the first correction mesh information and the second correction mesh information to a playback device, the first correction mesh information being for use in rendering image content captured by the first camera, the second correction mesh information being for use in rendering image content captured by the second camera. In some embodiments the first stereoscopic camera pair corresponds to a first direction and the processor is further configured to control the system 700 to transmit a stereoscopic content stream including encoded images generated from image content captured by the first and second cameras. In some embodiments the processor 708 is further configured to transmit to the playback device an environmental mesh model to be used in rendering image content. In some embodiments the processor 708 is further configured to transmit to the playback device a first UV map to be used for mapping portions of images captured by the first stereoscopic camera pair to a portion of the environmental mesh model as part of a image rendering operation. In some embodiments the processor 708 is further configured to control the system 700 to provide third correction mesh information and fourth correction mesh information to the playback device, the third correction mesh information being for use in rendering image content captured by a first camera of a second stereoscopic camera pair, the fourth correction mesh information being for use in rendering image content captured by a second camera of the second stereoscopic camera pair. In some embodiments the processor 708 is further configured to control the system 700 to indicate (e.g., transmit via network interface 710) to the playback device that the third and fourth correction mesh information should be used when content captured by the second camera pair is streamed to the playback device instead of content from the first camera pair. In some embodiments the processor 708 is further configured to control the system 700 to indicate to the playback device that the third and fourth correction mesh information should be used in response to the system detecting: i) a network controlled switch from streaming content from the first stereoscopic camera pair to the second stereoscopic pair or ii) a user controlled change from receiving a first content stream including content from the first stereoscopic camera pair to receiving a second content stream including encoded content from the second stereoscopic camera pair. In some embodiments the processor 708 is further configured to control the system 700 to system to provide the fifth and sixth correction mesh information to the playback device, the fifth correction mesh information being for use in rendering image content captured by the first camera of the third stereoscopic camera pair, the sixth correction mesh information being for use in rendering image content captured by the second camera of the third stereoscopic camera pair.

Figure 4:
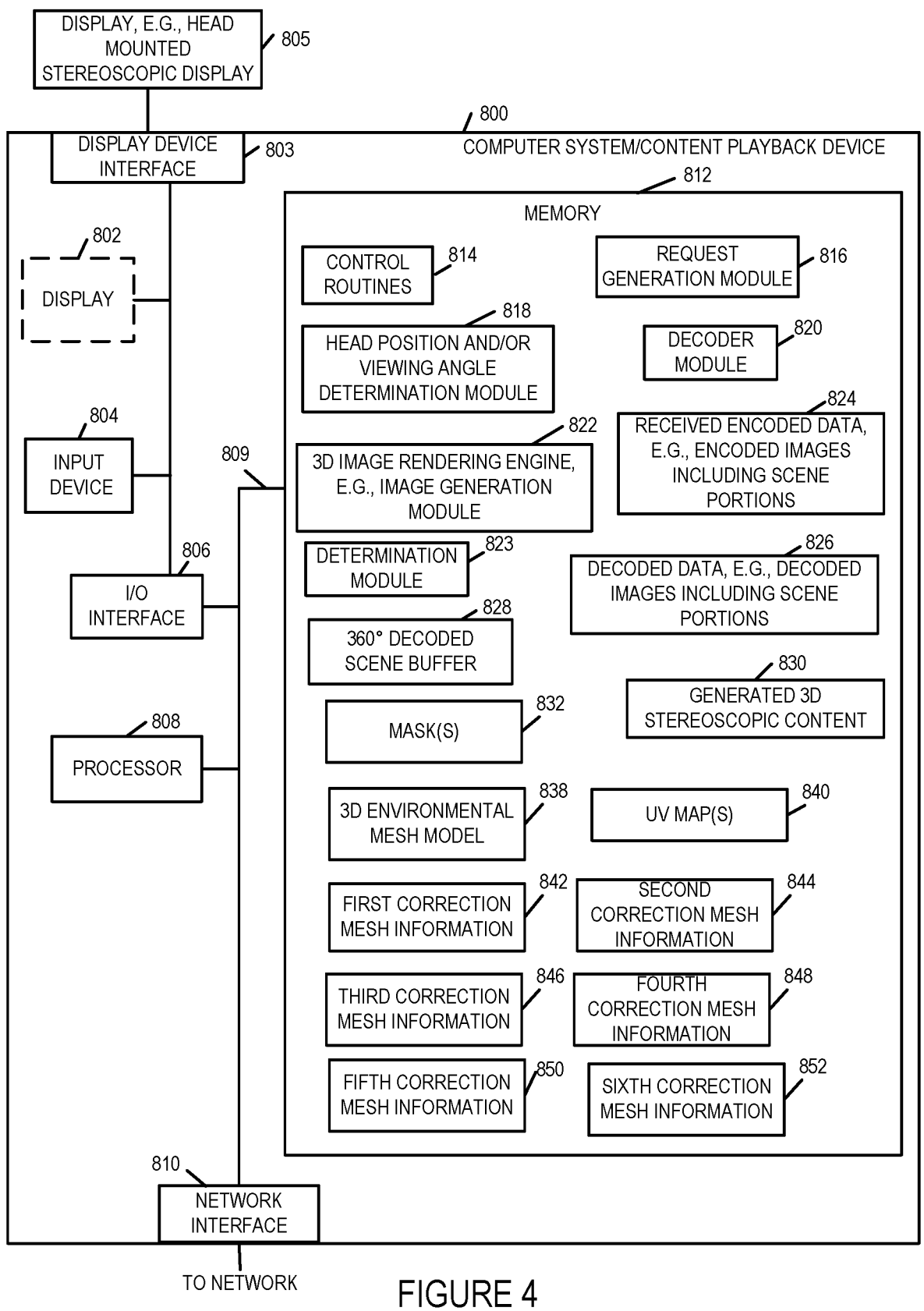
FIG. 4 illustrates an exemplary content playback device that can be used to receive, decode and display the content streamed by the system of FIG. 3.
Figure 7:
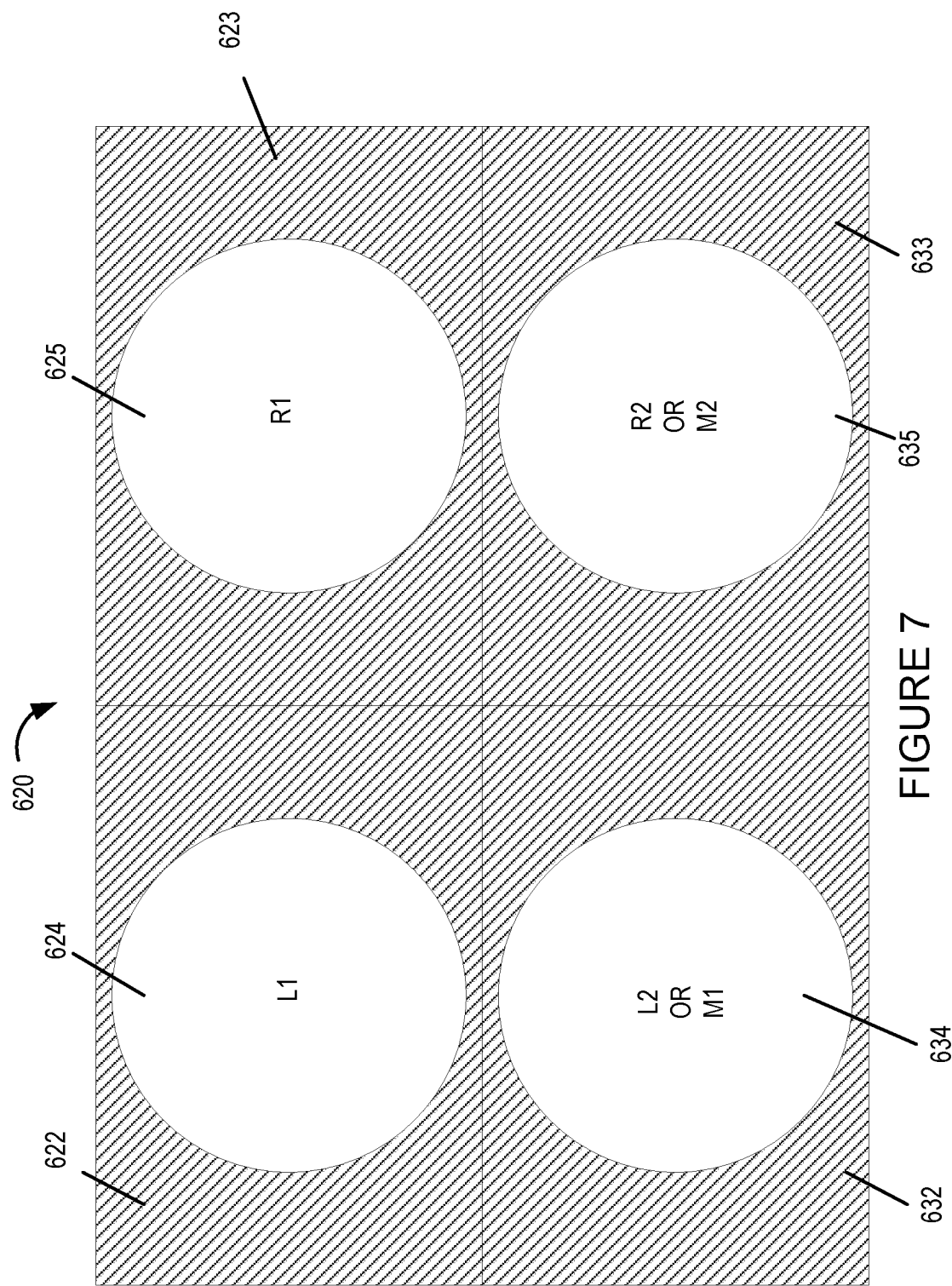
FIG. 7 illustrates four images, e.g., corresponding to images captured by 2 pairs of stereoscopic cameras or by 1 pair of stereoscopic cameras and two mono cameras, which may be combined into a single composite image and encoded using a HD encoder or ultra HD encoder, in accordance with an exemplary embodiment.

FIG. 4 illustrates a computer system/playback device 800 implemented in accordance with the present invention which can be used to receive, decode, store and display imaging content received from a content delivery system such as the one shown in FIGS. 1 and 7. The playback device may be used with a 3D head mounted display such as the OCULUS RIFT™ VR (virtual reality) headset which may be the head mounted display 805. The device 800 includes the ability to decode the received encoded image data and generate 3D image content for display to the customer. The playback device in some embodiments is located at a customer premise location such as a home or office but may be located at an image capture site as well. The device 800 can perform signal reception, decoding, display and/or other operations in accordance with the invention.

The device 800 includes a display 802, a display device interface 803, input device 804, input/output (I/O) interface 806, a processor 808, network interface 810 and a memory 812. The various components of the playback device 800 are coupled together via bus 809 which allows for data to be communicated between the components of the system 800. While in some embodiments display 802 is included as an optional element as illustrated using the dashed box, in some embodiments an external display device 805, e.g., a head mounted stereoscopic display device, can be coupled to the playback device via the display device interface 803.

Via the I/O interface 806, the system 800 can be coupled to external devices to exchange signals and/or information with other devices. In some embodiments via the I/O interface 806 the system 800 can receive information and/or images from an external device and output information and/or images to external devices. In some embodiments via the interface 806 the system 800 can be coupled to an external controller, e.g., such as a handheld controller.

The processor 808, e.g., a CPU, executes routines 814 and modules in memory 812 and uses the stored information to control the system 800 to operate in accordance with the invention. The processor 808 is responsible for controlling the overall general operation of the system 800. In various embodiments the processor 1108 is configured to perform functions that have been discussed as being performed by the playback system 800.

Via the network interface 810 the system 800 communicates and/or receives signals and/or information (e.g., including encoded images and/or video content corresponding to a scene) to/from various external devices over a communications network, e.g., such as communications network 105. In some embodiments the system receives one or more content streams including encoded images captured by one or more different cameras via the network interface 810 from the content delivery system 700. The received content stream may be stored as received encoded data, e.g., encoded images 824. In some embodiments the interface 810 is configured to receive a first encoded image including image content captured by a first camera and a second encoded image corresponding to a second camera. The network interface 810 includes a receiver and a transmitter via which the receiving and transmitting operations are performed. In some embodiments the interface 810 is configured to receive correction mesh information corresponding to a plurality of different cameras including first correction mesh information 842, second correction mesh information 844, third correction mesh information 846, fourth correction mesh information 848, fifth correction mesh information 850 and sixth correction mesh information 852 which are then stored in memory 812. Furthermore in some embodiments via the interface 810 the system receives one or more mask(s) 832, an environmental mesh model 838, UV maps(s) 840 which are then stored in memory 812.

The memory 812 includes various modules, e.g., routines, which when executed by the processor 808 control the playback device 800 to decoding and output operations in accordance with the invention. The memory 812 includes control routines 814, a request for content generation module 816, a head position and/or viewing angle determination module 818, a decoder module 820, a stereoscopic image rendering engine 822 also referred to as a 3D image generation module, a determination module, and data/information including received encoded image content 824, decoded image content 826, a 360 degree decoded scene buffer 828, generated stereoscopic content 830, mask(s) 832, an environmental mesh model 838, UV maps(s) 840 and a plurality of received correction mesh information sets including first correction mesh information 842, second correction mesh information 844, third correction mesh information 846, fourth correction mesh information 848, fifth correction mesh information 850 and sixth correction mesh information 852.

The control routines 814 include device control routines and communications routines to control the operation of the device 800. The request generation module 816 is configured to generate a request for content to send to a content delivery system for providing content. The request for content is sent in various embodiments via the network interface 810. The head position and/or viewing angle determination module 818 is configured to determine a current viewing angle and/or a current head position of the user, e.g., position of the head mounted display, and report the determined position and/or viewing angle information to the content delivery system 700. In some embodiments the playback device 800 periodically sends current head position information to the system 700.

The decoder module 820 is configured to decode encoded image content 824 received from the content delivery system 700 to produce decoded image data, e.g., decoded images 826. The decoded image data 826 may include decoded stereoscopic scene and/or decoded scene portions. In some embodiments the decoder 820 is configured to decode the first encoded image to generate a first decoded image and decode the second received encoded image to generate a second decoded image. The decoded first and second images are included in the stored decoded image images 826.

The 3D image rendering engine 822 performs the rendering operations (e.g., using content and information received and/or stored in memory 812 such as decoded images 826, environmental mesh model 838, UV map(s) 840, masks 832 and mesh correction information) and generates 3D image in accordance with the features of the invention for display to the user on the display 802 and/or the display device 805. The generated stereoscopic image content 830 is the output of the 3D image generation engine 822. In various embodiments the rendering engine 822 is configured to perform a first rendering operation using the first correction information 842, the first decoded image and the environmental mesh model 838 to generate a first image for display. In various embodiments the rendering engine 822 is further configured to perform a second rendering operation using the second correction information 844, the second decoded image and the environmental mesh model 838 to generate a second image for display. In some such embodiments the rendering engine 822 is further configured to use a first UV map (included in received UV map(s) 840) to perform the first and second rendering operations. The first correction information provides information on corrections to be made to node positions in the first UV map when the first rendering operation is performed to compensate for distortions introduced into the first image by a lens of the first camera and the second correction information provides information on corrections to be made to node positions in the first UV map when the second rendering operation is performed to compensate for distortions introduced into the second image by a lens of the second camera. In some embodiments the rendering engine 822 is further configured to use a first mask (included in mask(s) 832) to determine how portions of the first image are combined with portions of a first image corresponding to a different field of view as part of the first rendering operation when applying portions of the first image to a surface of the environmental mesh model as part of the first rendering operation. In some embodiments the rendering engine 822 is further configured to use the first mask to determine how portions of the second image are combined with a portions of a second image corresponding to the different field of view as part of the second rendering operation when applying portions of the second image to the surface of the environmental mesh model as part of the second rendering operation. The generated stereoscopic image content 830 includes the first and second images (e.g., corresponding to left and right eye views) generated as a result of the first and second rendering operation. In some embodiments the portions of a first image corresponding to a different field of view correspond to a sky or ground field of view. In some embodiments the first image is a left eye image corresponding to a forward field of view and the first image corresponding to a different field of view is a left eye image captured by a third camera corresponding to a side field of view adjacent the forward field of view. In some embodiments the second image is a right eye image corresponding to a forward field of view and wherein the second image corresponding to a different field of view is a right eye image captured by a fourth camera corresponding to a side field of view adjacent the forward field of view. Thus the rendering engine 822 renders the 3D image content 830 to the display. In some embodiments the. The operator of the playback device 800 may control one or more parameters via input device 804 and/or select operations to be performed, e.g., select to display 3D scene.

The network interface 810 allows the playback device to receive content from the streaming device 114 and/or communicate information such as view head position and/or position (camera rig) selection indicating selection of particular viewing position at an event. In some embodiments the decoder 820 is implemented as a module. In such embodiments when executed the decoder module 820 causes received images to be decoded while 3D image rendering engine 822 causes further processing of the images in accordance with the present invention and optionally stitching of images together as part of the presentation process.

In some embodiments the interface 810 is further configured to receive additional mesh correction information corresponding to a plurality of different cameras, e.g., third, fourth, fifth and sixth mesh correction information. In some embodiments the rendering engine 822 is further configured to use mesh correction information corresponding to a fourth camera (e.g., fourth mesh correction information 848) when rendering an image corresponding to a fourth camera, the fourth camera being one of the plurality of different cameras. The determination module 823 is configured to determine which mesh correction information is to be used by the rendering engine 822 when performing a rendering operation based on which camera captured image content is being used in the rendering operation or based an indication from a server indicating which mesh correction information should be used when rendering images corresponding to a received content stream. The determination module 823 may be implemented as part of the rendering engine 822 in some embodiments.

In some embodiments the modules and/or elements shown in the memory 712 of FIG. 3 and memory 812 of FIG. 4 are implemented as software modules. In other embodiments the modules and/or elements, while shown to be included in the memory, are implemented in hardware, e.g., as individual circuits with each element being implemented as a circuit for performing the function corresponding to the element. In still other embodiments the modules and/or elements are implemented using a combination of software and hardware.

Figure 8:
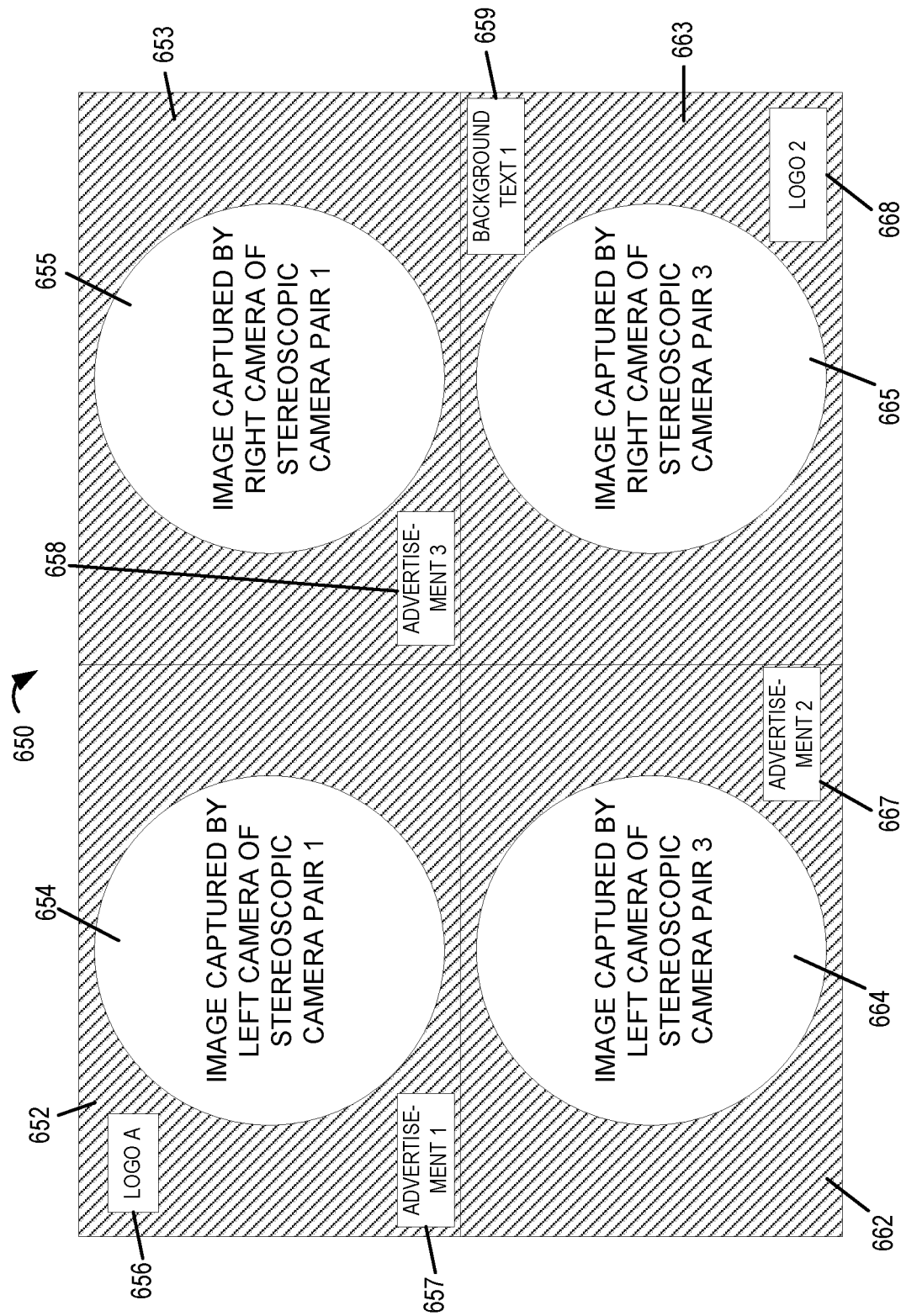
FIG. 8 illustrates an example in which the combined image to be encoded, e.g., by an HD encoder or an ultra HD encoder, includes captured images from two pairs of stereoscopic cameras and additional image content, in accordance with an exemplary embodiment.

While shown in FIGS. 7 and 8 to be included in the memory, the elements shown included in the system 700 and 800 can, and in some embodiments are, implemented fully in hardware within the processor, e.g., as individual circuits, of the corresponding device, e.g., within the processor 708 in case of the content delivery system and within the processor 808 in the case of playback system 800. In other embodiments some of the elements are implemented, e.g., as circuits, within the corresponding processors 708 and 808 with other elements being implemented, e.g., as circuits, external to and coupled to the processors. As should be appreciated the level of integration of modules on the processor and/or with some modules being external to the processor may be one of design choice. Alternatively, rather than being implemented as circuits, all or some of the elements may be implemented in software and stored in the memory, with the software modules controlling operation of the respective systems 700 and 800 to implement the functions corresponding to the modules when the modules are executed by their respective processors, e.g., processors 708 and 808. In still other embodiments, various elements are implemented as a combination of hardware and software, e.g., with a circuit external to the processor providing input to the processor which then under software control operates to perform a portion of a module's function.

While shown in each of FIGS. 3 and 4 embodiments as a single processor, e.g., computer, it should be appreciated that each of the processors 708 and 808 may be implemented as one or more processors, e.g., computers. When one or more elements in the memory 712 and 812 are implemented as software modules, the modules include code, which when executed by the processor of the corresponding system (e.g., processor 708 and 808) configure the processor to implement the function corresponding to the module. In embodiments where the various modules shown in FIGS. 7 and 8 are stored in memory, the memory is a computer program product comprising a computer readable medium comprising code, e.g., individual code for each module, for causing at least one computer, e.g., processor, to implement the functions to which the modules correspond.

Completely hardware based or completely software based modules may be used. However, it should be appreciated that any combination of software and hardware, e.g., circuit implemented modules may be used to implement the functions. As should be appreciated, the modules illustrated in FIG. 3 control and/or configure the system 700 or elements therein such as the processor 708, to perform the functions of corresponding steps of the methods of the present invention, e.g., such as those illustrated and/or described in the flowchart of FIG. 10. Similarly the modules illustrated in FIG. 4 control and/or configure the system 800 or elements therein such as the processor 808, to perform the functions of corresponding steps of the methods of the present invention.

Figure 5:
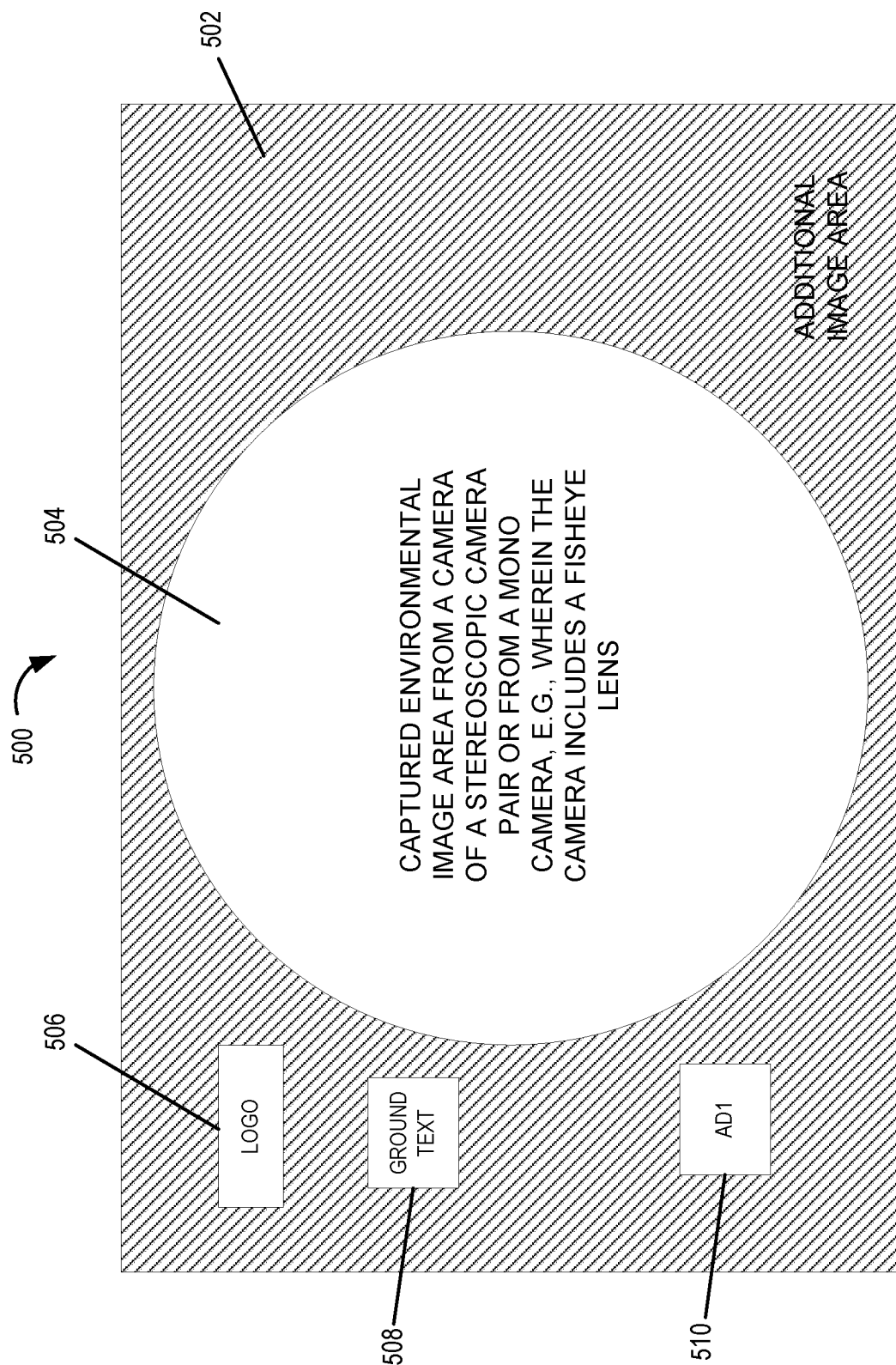
FIG. 5 illustrates an exemplary image to be encoded, the image including a captured environmental image area from a camera, e.g., a camera including a fisheye lens, of a stereoscopic image pair of cameras or a mono camera, and an additional image area, in which additional image content has been inserted in the additional image area in accordance with an exemplary embodiment.

FIG. 5 illustrates an exemplary image to be encoded, the image including a captured environmental image area from a camera, e.g., a camera including a fisheye lens, of a stereoscopic image pair of cameras or a mono camera, and an additional image area, in which additional content has been placed in the additional image area in accordance with an exemplary embodiment. The image 500 is a composite image in that it includes a logo 506, ground text 508 an Advertisement AD1 510 which were combined with a captured image 504 prior to being output by compositor 246 to the encoder 248. In FIG. 5 the area 504 corresponds to the image captured by a camera of the image capture system using a fish eye lens. In the example the captured image portion 504 of the frame with the additional image area 502 not being used to capture the environmental portion due to the way the fish eye lens directs light onto the sensor. This additional image area 502 is used in accordance with the invention to communicate additional image content. e.g., a portion of an image captured by another camera different from the one that captured the image portion shown in area 504 or additional content such as an advertisement supplied by a server. The location of the additional image content 506, 508, 510 and information on how and/or when it should be used is communicated in some embodiments as metadata included in the encoded frame conveying the image 500.

While in some embodiments the composite frame 500 is encoded as an individual frame in other embodiments it is one portion of a larger composite image. In one embodiment, the image shown in FIG. 5 represents one quarter of a combined composite image that is generated in an embodiment in which a UHD (Ultra High Definition) encoder is used to generate, e.g., encode, 4 images that were combined into a single UHD image by the compositor 246.0

Figure 6:
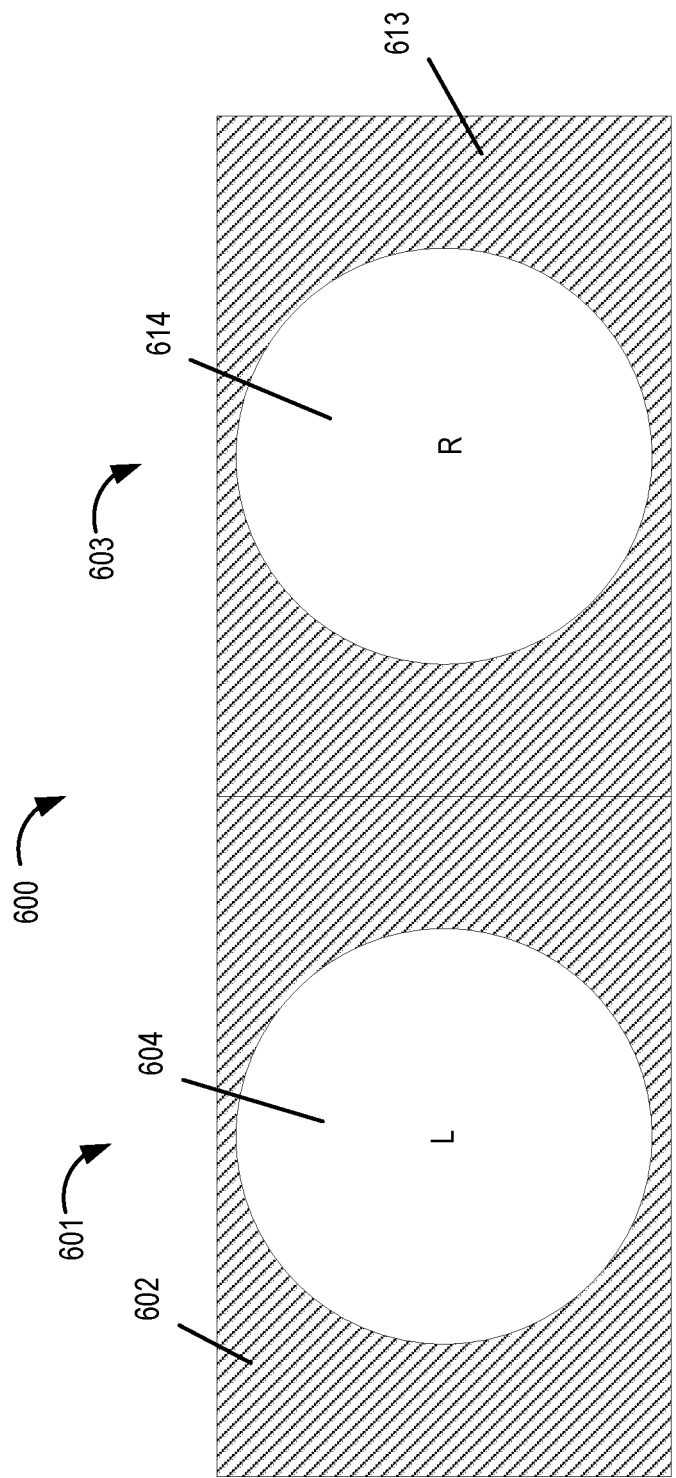
FIG. 6 illustrates a pair of exemplary images to be encoded, each image corresponding to one of the cameras of a stereoscopic image pair.

FIG. 6 illustrates a pair 600 of exemplary images to be encoded, each image corresponding to one of the cameras (203, 204) (208, 210) or (214, 216) of a stereoscopic image pair that was captured using fish eye lenses. The pair 600 includes a left eye image 601 and a right eye 603 image which are captured by different cameras of a stereo camera pair. The left eye image 601 includes a captured image area 604 and an additional unused image area 602. Similarly the right eye image 603 includes a captured right eye view portion 614 of an environment surrounded by an additional image area 613.

FIG. 7 illustrates a composite frame formed from four images 624, 625, 634, 635, e.g., corresponding to two pairs of images captured by 2 pairs of stereoscopic cameras or by 1 pair of stereoscopic cameras and two mono cameras, which are combined into a single composite image and encoded using a HD encoder or an ultra HD encoder, in accordance with an exemplary embodiment. Note that additional image data is not included in areas 622, 623, 632, 634 these image portions will be wasted since they do not include an image of an environment or additional content.

FIG. 8 illustrates an example in which the combined image 650 to be encoded, e.g., by an HD encoder or ultra HD encoder, includes captured images 654, 655, 664, 665 from two pairs of stereoscopic cameras and additional content 656, 657, 658, 667, 668, in accordance with an exemplary embodiment. Note that the additional content is included in the portions 652, 653, 662, 663 which are not used to communicate the images captured by the stereo pairs using fish eye lenses. While the additional content is communicated in a corner area or central frame portion which would otherwise go unused, it can be used in any number of displayed images, e.g., in both the left and right eye images or a single image at playback time with the metadata included in the encoded frame generated by encoding image 650 providing information on how and when the additional image content is to be used.

Figure 9:
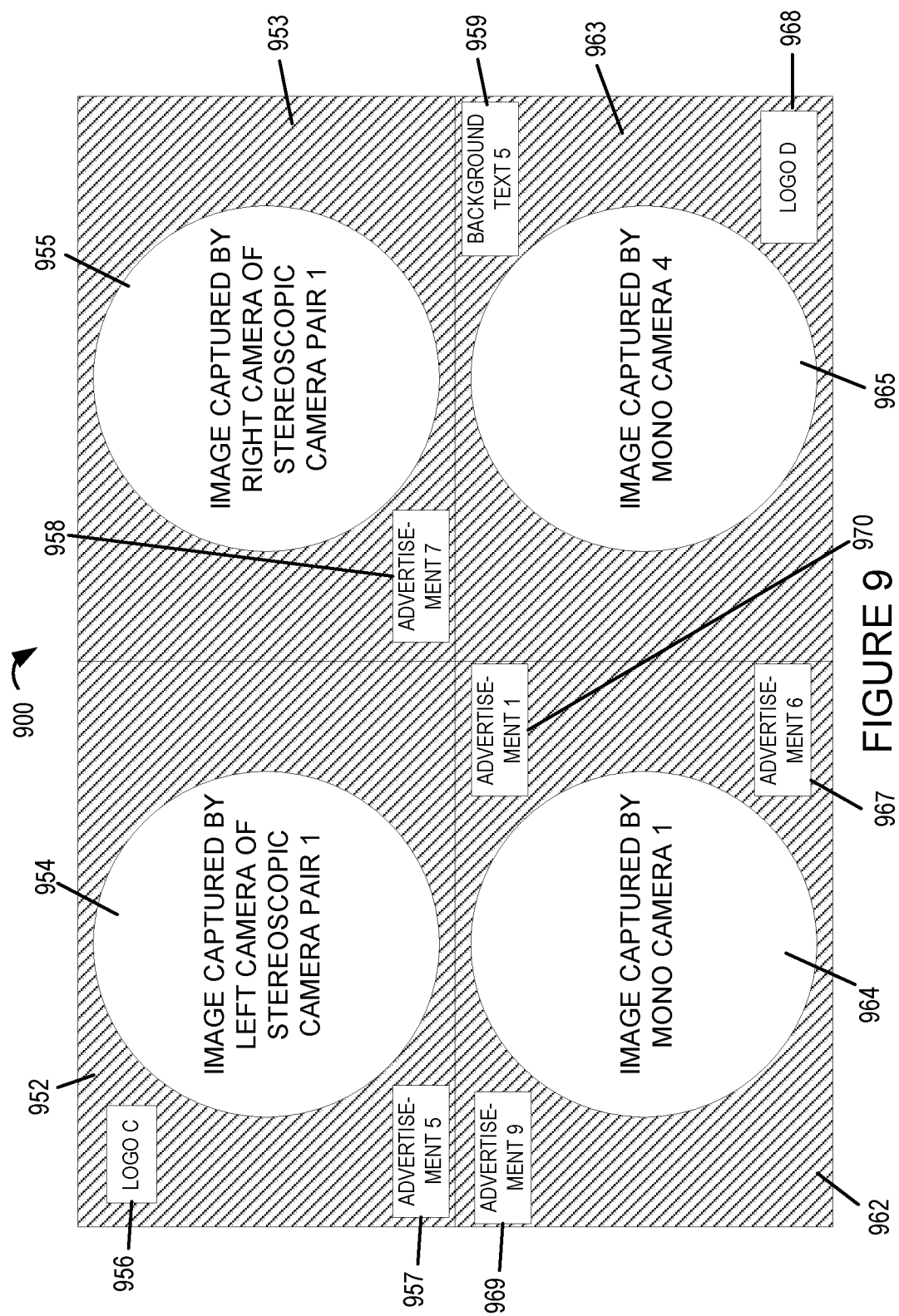
FIG. 9 illustrates an example in which the combined image to be encoded, e.g., by an HD encoder or an Ultra HD encoder, includes captured images from one pair of stereoscopic cameras, two mono cameras, and additional image content, in accordance with an exemplary embodiment.

FIG. 9 illustrates another example 900 in which the combined image to be encoded, e.g., by an HD encoder or ultra HD encoder, includes captured images and additional image content. In the FIG. 9 example a single stereo pair of images 954, 955 is communicated in the same frame as two images 964, 965 captured by different mono cameras. The composite image 900 includes additional image content 956 included in additional image area 952, advertisement 958 included in additional image area 953, advertisements 969, 970 and 967 included in additional image area 962 and text 959 along with LOGO D 968 in additional image area 963. from one pair of stereoscopic cameras, two mono cameras, and additional content, in accordance with an exemplary embodiment.

Figure 10A:
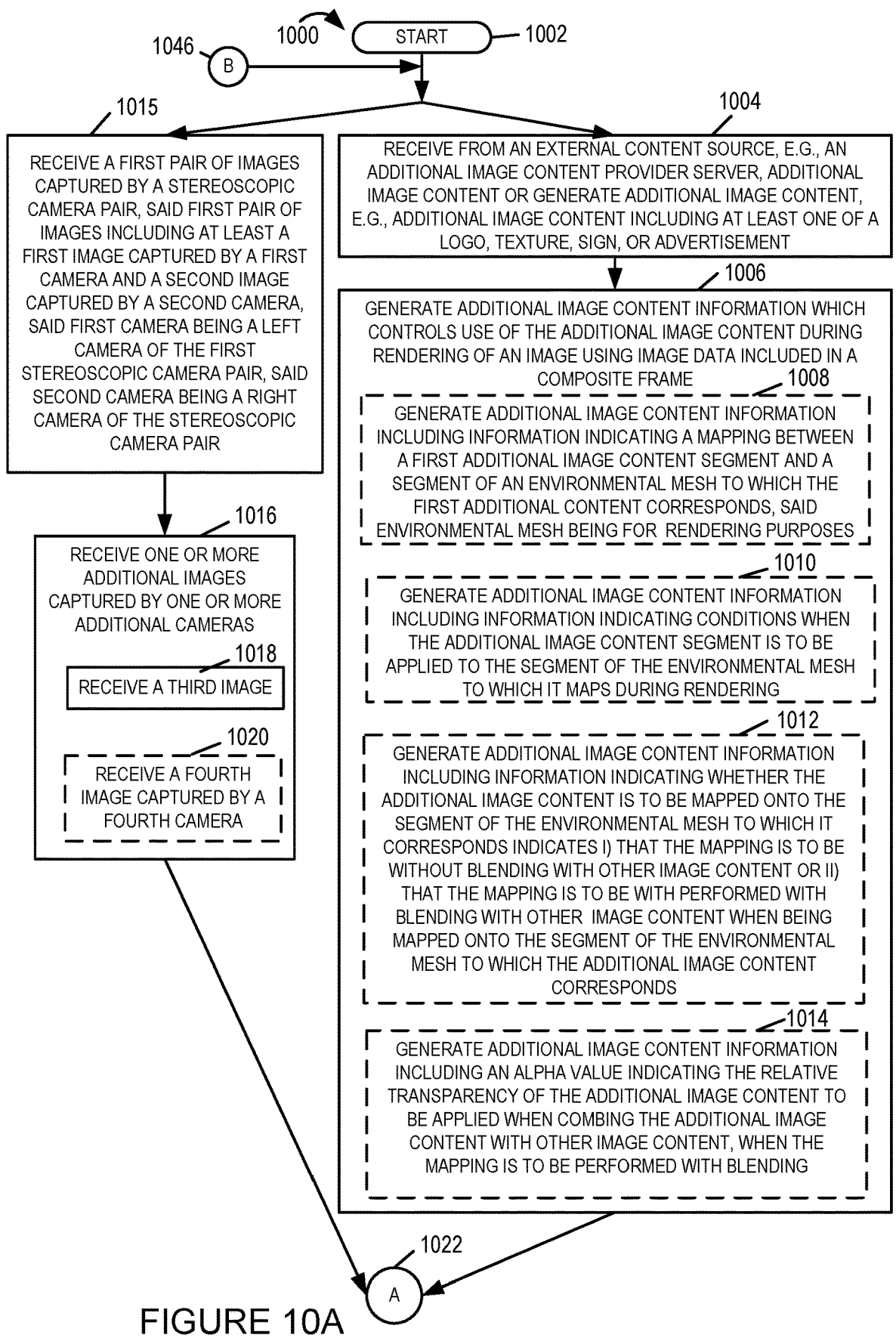
FIG. 10A is a first part of flowchart of an exemplary method of receiving and processing captured images in accordance with an exemplary embodiment.

FIG. 10, comprises the combination of FIG. 10A and FIG. 10B, and shows steps of a method of the invention which can be implemented using one or more components of a system such as the one shown in FIG. 2.

While steps are shown in an exemplary order it should be appreciated that in many cases the order of the steps may be altered without adversely affecting operation. Accordingly, unless the exemplary order of steps is required for proper operation, the order of steps is to be considered exemplary and not limiting.

The method 1000 beings in start step 1002 with the system shown in FIG. 2 being powered on. Operation proceeds from start step 1002 to steps 1015 and 1004 which are steps in two different processing branches which can be performed in parallel.

The first processing path begins with step 1015 and relates to receipt of images captured by one or more cameras, e.g., cameras with fish eye lenses in some embodiments. The receipt of the images in steps 1015 is from memory and may be, and sometimes is, performed by the combined content selector and compositor device 247. Prior to this step the images captured by the cameras of the image capture system 102 may be, and sometimes are, received by the receiver 245 and/or decoder 242 which receive captured images either directly or indirectly from the cameras used to capture images. The decoder 242 decodes the encoded images captured by the capture system, e.g., from image processor 207, and stored the images in memory 250 in the set of images from the cameras 258. The cameras from which the images are obtained may be, and sometimes are, cameras of a stereo camera pair 202, 206, 212 or mono cameras 218, 220, 222. The images 258 from the cameras are supplied to the content selector and compositor device 247, either directly from decoder 242 or from memory 250. Thus in step 1015 the content selector and compositor device 247 receives a first pair of images captured by a stereoscopic camera pair for processing. The first pair of images captured by a stereoscopic camera pair, received in step 1015 may be the same or similar to the images shown in FIG. 6. As part of steps 1015 at least a first image captured by a first camera and a second image captured by a second camera are received where the first and second cameras are cameras of the first stereoscopic camera pair 202.

Operation proceeds from step 1015 to step 1016 in which one or more additional images captured by one or more additional cameras, e.g., cameras of another stereo pair 206, 212 or mono cameras 218, 220, 222 are received, e.g., by the content selector and compositor device 247. Step 1016 includes receiving at least a third image in sub step 1018 and optionally includes receiving a fourth image captured by a fourth camera in sub-step 1020. Operation proceeds via connecting node 1022 to step 1024.

Processing along the second processing path which begins with step 1004 relates to receiving and/or generating additional image content which can be included in a frame to be communicated to a playback device, e.g., along with image content captured by a camera using a fish eye lens.

In step 1004 additional image content is received by the image processing and content delivery system 104 and stored in the memory 250 so that it is available for use by the content selector and compositor device 247. The additional content is received from an external content source, e.g., server 266, and includes in some embodiments at least one of a logo, texture, sign, or advertisement.

Operation proceeds from step 1004 to step 1006 in which the image processing and content delivery system 104 under control of processor 240 generates additional image content information. This information can be included with an encoded frame as metadata that is communicated with, e.g., as part of, the encoded frame. In some embodiments the generated additional image content information controls when and/or how the additional image content will be used during image rendering to generate a rendered image from a composite frame, e.g., a composite frame including a captured image captured by a camera and at least some additional image content. In some embodiments the additional image content was captured by another camera or obtained from the external content source 266.

Step 1006 includes one or more of steps 1008, 1010, 1012, and 1014 which may be, and sometimes are, performed by the processor 240 of the image processing and content delivery system 104. In step 1008 the image processing and content delivery system 104 generates, e.g., by operating the processor 240 to perform the generation step, additional image content information including information indicating a mapping between a first additional image content segment and a segment of an environmental mesh to which the first additional content corresponds. In some cases the environmental mesh is a model of a portion of an environment to which the first additional image content segment is to be applied as a texture during image rendering. In this way, the playback device can be, and sometimes is, informed by the additional image content information of how to use the additional image content, e.g., as a texture.

In step 1010 the image processing and content delivery system 104 generates, e.g., by operating the processor 240 to perform the generation step, additional image content information including information indicating conditions when the additional image content segment is to be applied to the segment of the environmental mesh to which it maps during rendering. This condition information allows use of the additional image content to be dependent on one or more conditions, e.g., a portion of the captured image being rendered, a time or date upon which rendering is occurring, user information which allowed for selection of which of a plurality of additional images are to be displayed, etc. Thus date and/or other constraints can be placed on use of additional image content so that content which is time relevant or directed to a particular audience can be selectively used based on the information and known playback time or viewer information or some other condition such as the geographic location where the playback is occurring. Thus for example one advertisement (ad) may be displayed if playback occurs in one geographic location because the playback device is located in one state or city and another ad, received in a frame as additional content, may be included during rendering in the image generated by the playback device from a received encoded frame if the playback occurs at another geographic location, e.g., another state or city.

In step 1012 the image processing and content delivery system 104 generates, e.g., by operating the processor 240 to perform the generation step, additional image content information including blending information. It should be appreciated that additional image content to be communicated in a frame with captured image content corresponding to a portion of an environment may correspond to the same segment of an environmental mesh model to which image portions are applied as textures during rendering with the intention that the additional image content replace or be combined with the captured portion of the environment corresponding to the same segment of the environmental model. In some embodiments the information generated in step 1012 indicates whether the additional image content is to be mapped onto the segment of the environmental mesh to which it corresponds without blending with other image content, e.g., captured image content of a portion of an environment, or that the mapping is to be performed with blending with other image content. For example the information generated in step 1012 may indicate that the additional image content is to be blended with captured image content corresponding to a portion of an environment that was captured and included in main captured environmental image portion of a frame or if the additional image content is to be used as a texture in place of a portion of the captured environmental image portion.

In step 1014 the image processing and content delivery system 104 generates, e.g., by operating the processor 240 to perform the generation step, additional image content information including an alpha value indicating the relative transparency of the additional image content to be applied when combining the additional image content with other image content, e.g., a image of a portion of an environment, when mapping of the image portions is to be performed with blending. Thus when the additional image content maps to the same portion of a model during rendering the alpha value will control how transparent the additional image content is when applied as a texture or if the additional image content is to be applied as a solid texture fully covering other image content corresponding to the same portion of the model of the environment. It should be appreciated that in many embodiments the rendered image generated by a playback device will include the result of applying the additional image content to the corresponding portion, e.g., segment of a model of the environment with the alpha value in at least some embodiments controlling the level of transparency of the additional image portion applied as a texture.

The received images of the environment that were captured by one or more cameras are supplied to the content selector and compositor 247 as indicated by the arrows 271 (from decoder 242), 275 (from memory) as shown in FIG. 2 for use in generating a composite image to be encoded. Thus the image output by the compositor 246 will be a composite image including what may be referred to as an original captured image portion and additional image content. The original captured image portion may be, and sometimes is, an image from a selected camera feed while the additional image content may be text, ads or other content that was selected by the content selector 244 in response to or under control of the content selector control signal 249. Thus the content selector control signal 249 serves as both a source camera selector as well as an additional image content selector control that controls what content will be selected by content selector 244 for composing.

The additional information generated in step 1006 is supplied to the encoder 248 as represented by arrow 277 for inclusion in an encoded frame or as metadata corresponding to an encoded frame which also includes a composite frame supplied from the compositor 246 to the encoder 248.

Operation proceeds from step 1006 to step 1024 via connecting node A 1022. Thus by the time step 1024 is reached, the image content and delivery system 104 will have received images of an environment captured by one or more cameras, additional image content, and additional image content information will have been generated and be available for encoding.

In step 1024 the content selection and compositor device 247 receives a content selection control signal which includes a camera selection control signal which indicates where additional images should be obtained from for combining with the first and second images received from what may be considered the primary stereoscopic camera pair. Step 1024 is used in embodiments where four frames are to be combined, e.g., composited, into one UHD frame for encoding purposes. Step 1024 may be omitted when packing of four frames into a UHD frame is not being implemented and a single frame is to be encoded or a pair of first and second frames it to be composited and encoded. In the case where a single stereo pair of frames is to be encoded a single camera feed may be supplied to the image processing and content delivery system 104 with the source camera selector control signal sent to the controller 205 controlling which camera pair servers as the source of captured images. However in other embodiments the system 104 receives images captured by multiple camera pairs and the content selector control signal 249 is used to control which images are selected for composting.

In some embodiments steps 1024 includes step 1026 while in other embodiments step 1024 includes step 1028. In step 1026 the content selector and compositor device 247 receives a camera selection control signal that specifies a stereoscopic camera pair (202, 206 or 212) to be used as the source of third and fourth images. The camera selection control signal received in step 1026 may be and sometimes is part of signal 249. In step 1028 the content selector and compositor device 247 receives a camera selection control signal specifying two different mono cameras (218, 220, 222) to be used as the sources of the third and fourth images.

The content selector control signal 249 indicates in addition to one or more captured images, additional image content to be included in a composite image to be encoded, e.g., in locations not used for the main captured images. The compositor content selector and compositor 247 is responsive to the content selector control to combine one or more identified images captured by a camera or cameras with the additional image content in a way that the additional image content does not occupy the space occupied by the main captured images of the environment. FIGS. 5, 8 and 9 show various examples of composite images that may be, and sometimes are, generated by the compositor 246 and supplied to the encoder 248 via line 259 for encoding.

With the image content for compositing having been identified by the content/camera selector control signal 249, operation proceeds from step 1024 to compositing step 1030 which may be, and sometimes is, implemented by the compositor portion 246 of the content selector and compositor device 247.

In step 1030 a composite image is generated. The composite image includes one or more images of the environment, along with some additional image content. The images of the environment were captured using fish eye lenses, in some but not necessarily all embodiments. The composite image can, and sometimes does, include one, two or four images of the environment, depending on the embodiment, along with additional image content placed in the images at locations, e.g., corner and middle frame locations, where it does not interfere with the images of the environment captured using the fish eye lens or lenses.

Step 1030 in some embodiments includes step 1036. Step 1030 may also include step 1034 in some embodiments. In step 1036 the compositor inserts into the composite image, e.g., composite frame, being generated, in an additional image area, additional image content. The additional image content is image content that was not captured by the camera or cameras which supply the image or images of the environment included in the composite image. The additional image content in some embodiments includes at least one of a logo, texture, sign or advertisement. Other information maybe includes ad well such as text or other information. The sign may include text or other information such as scores, the name of a team, etc. In optional step 1034, which is used in embodiments where four frames are packed into a single frame for encoding purposes, e.g., as a UHD frame, the first, second, third and fourth images are combined to generate a composite image. Additional image content is added to the composite image in step 1036.

In step 1027 an encoder 248 receives the composite frame and additional image content information which can include control information as well as information indicating how one or more segments of additional image content included in the composite frame being encoded should be applied as textures to a corresponding segment or segments of a mesh model by a playback device during image rendering. In this way the encoder 248 receives not only the composite image but information which can be used to control use of the additional image content in the composite image, e.g., information that can be used to determine what additional image content is to be used at a given time and how such additional image content should be used during an image rendering operation used to generate an image to be displayed to a user of a playback device.

The composite image generated in step 1030 including at least one image of an environment and additional image content, is supplied to the encoder 248 and encoded in step 1038. In step 1038 the encoding produces encoded content including an embodiment image including the image content from one or more captured images and the additional image content. The encoded content also includes at least some of the additional image content information 260 which can be included in the generated encoded content, e.g., a set of encoded image and control information, as metadata or as part of the generated encoded frame.

Step 1038 includes in some embodiments includes step 1040 and/or step 1042. In step 1040 an ultra high definition television encoder is used to encode the composite image. Use of such an encoder is optional and other coders may be used in some embodiments. In step 1042 the additional image content information is encoded in or with the composite image, e.g., as data embedded in the image or as metadata communicated with the encoded pixel values representing the encoded image. Operation proceeds from step 1038 to step 1044 where the first encoded images is stored and/or output. The output of the generated encoded image is to the content delivery device 114 via network interface 262 in some embodiments. The content delivery device 114 may be a streaming server which streams the generated encoded images including or with the metadata conveying the additional image information to a playback device which can decode, recover and use both the image or images of the environment and/or additional image content in a rendering operation which generates an image to be displayed to a user of the playback device.

With an encoded frame having been output, operation proceeds from step 1044, via connecting node B 1046, back to steps 1015, 1004 where additional frames and/or additional image content are processed as part of generating another encoded frame for streaming to a playback device. The image capture and encoding may and sometimes does occur in real time allowing images to be captured and streamed with additional image content while a sporting event or other activity is still ongoing.

Figure 11:
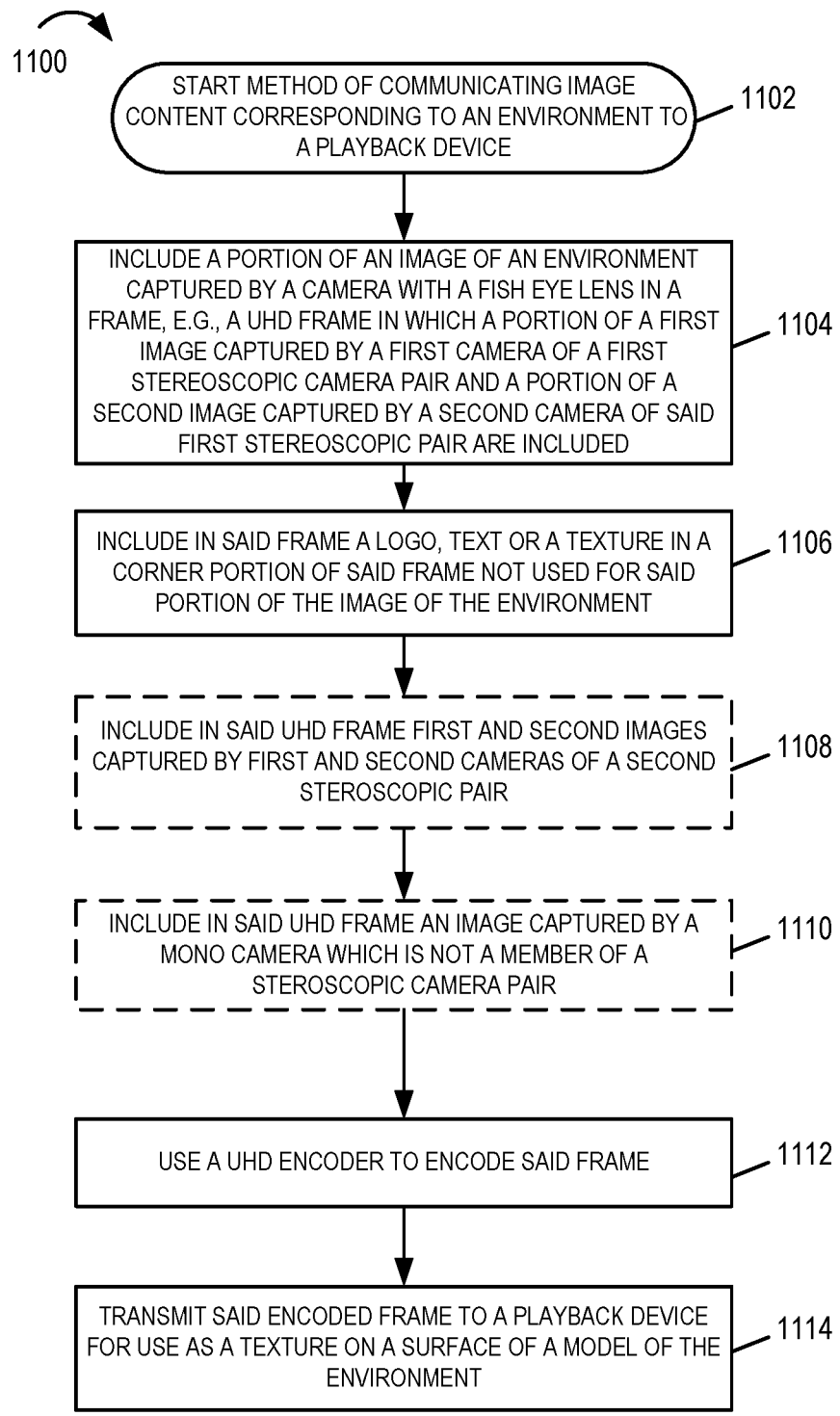
FIG. 11 is a flowchart of an exemplary method of communicating image content corresponding to an environment to a playback device, in accordance with an exemplary embodiment.

FIG. 11 is a flowchart 1100 of an exemplary method of communicating image content corresponding to an environment to a playback device, in accordance with an exemplary embodiment. Flowchart 1100 may be performed by image processing and content delivery system 104. Operation starts in step 1102 and proceeds to step 1104.

In step 1104 the content selector and compositor device 247 of the network headend image processing, calibration and encoding device 112 of the image processing content and delivery system 104 includes a portion of an image of an environment captured by a camera with a fish eye lens in a frame. The frame is, e.g., UHD frame in which a portion of a first image captured by a first camera of a first stereoscopic pair and a portion of a second image captured by a second camera of said first stereoscopic pair are included. Operation proceeds from step 1104 to step 1106.

In step 1106 the content selector and compositor device 247 includes in said frame a logo, text, or a texture in a corner portion of said frame not used for said portion of the image of the environment. In some embodiments, one or both of steps 1108 and 1110 are included.

In step 1108 content selector and compositor device 247 includes in said UHD frame first and second images captured by first and second cameras of a second stereoscopic pair. In step 1110, the content selector and compositor device includes in said UHD frame an image captured by a mono camera which is not a member of a stereoscopic camera pair.

In step 1112 the network headend image processing, calibration and decoding device 112 of image processing and content delivery system 104 uses a UHD encoder, e.g. UHD encoder 248, to encode said frame. Operation proceeds from step 1112 to step 1114.

In step 1114 the content delivery device 114, e.g., a streaming server, of the image processing and content delivery system 104 transmits said encoded frame to a playback device, e.g., playback device 122, for use as texture on a surface of a model of the environment.

Figure 12:
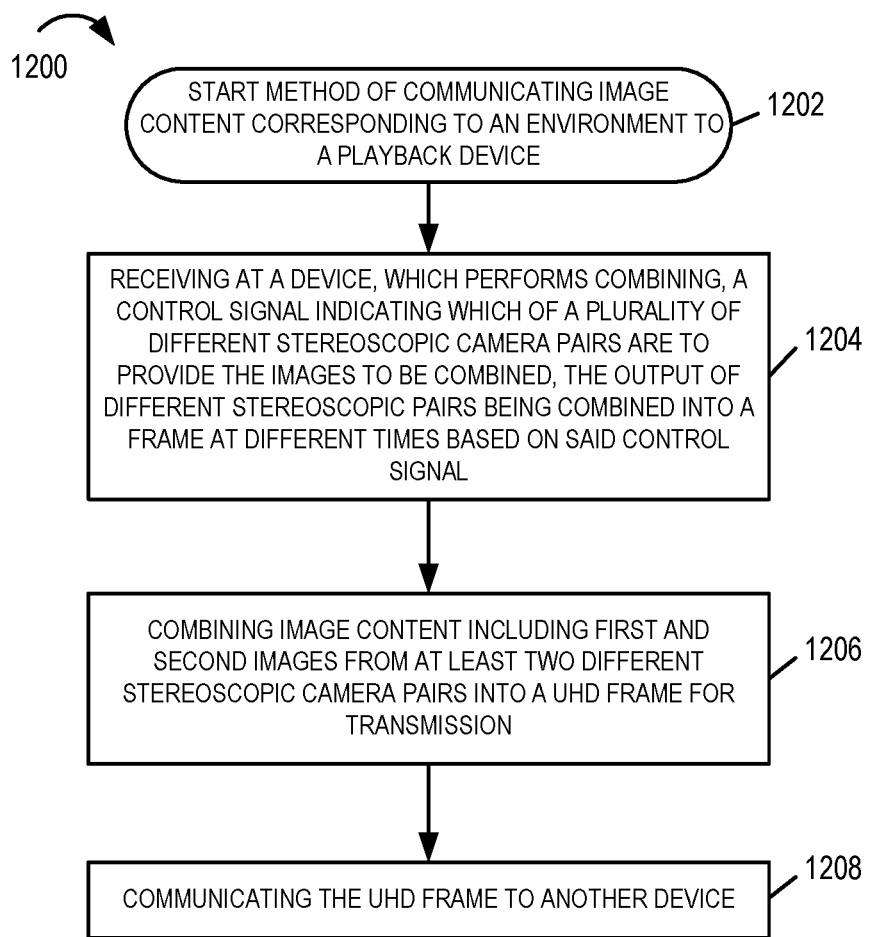
FIG. 12 is a flowchart of an exemplary method of communicating image content corresponding to an environment to a playback device, in accordance with an exemplary embodiment.

FIG. 12 is a flowchart 1200 of an exemplary method of communicating image content corresponding to an environment to a playback device, in accordance with an exemplary embodiment. Flowchart 1200 may be performed by image processing and content delivery system 104 of FIG. 2. Operation starts in step 1202 and proceeds to step 1204.

In step 1204, a device, e.g., content selector and compositor device 247, which performs combining, receives a control signal, e.g., control selector signal 249, indicating which of a plurality of different stereoscopic camera pairs (202, 206, . . . , 212) are to provide the images to be combined, the output of different stereoscopic pairs being combined into a frame at different times based on said control signal 249. In some embodiments, the content selection portion 244 of content selector and compositor device 247 performs the reception of step 1204. Operation proceeds from step 1204 to step 1206.

In step 1206 the compositor portion 246 of the content selector and compositor device 247 combines image content including first and second images from a least two different stereoscopic camera pairs, e.g., first stereoscopic camera pair 202 and second stereoscopic camera pair 206, into a UHD frame for transmission. Operation proceeds from step 1206 to step 1208.

In step 1208, the content delivery device 114, e.g., a streaming server, communicates the UHD frame to another device, e.g., playback device 122.

LIST OF FIRST SET OF NUMBERED EXEMPLARY EMBODIMENTS

Exemplary embodiment 1. A method comprising: receiving (1015) a first image captured by a first camera (203) using a first fish eye lens (2); and generating (1032) a composite image by combining a portion of the first image with additional image content; operating an encoder to: i) receive (1037) the composite image and additional image content information; and ii) generate (1038) encoded content including a first encoded composite frame and said additional image content information.

Exemplary embodiment 2. The method of exemplary embodiment 1, wherein said additional image content information includes control information which controls use of the additional image content by a playback device (122) during rendering of an image.

Exemplary embodiment 3. The method of exemplary embodiment 2, wherein said additional image content information is communicated as metadata.

Exemplary embodiment 4. The method of exemplary embodiment 1, wherein said first camera (203) is a first camera of a stereoscopic camera pair (202) including said first camera (203) and a second camera (204) including a second fish eye lens (3), the method further comprising: receiving (1015) a second image captured by the second camera (204) using the second fish eye lens (3); and wherein generating (1032) a composite image by combining a portion of the first image with additional image content includes combining said first and second images with said additional image content.

Exemplary embodiment 5. The method of exemplary embodiment 4, further comprising: receiving (1016) one or more additional images; and wherein generating (1032) a composite image includes combining said first and second images with a third image and said additional image content, said third image being one of said additional images.

Exemplary embodiment 6. The method of exemplary embodiment 1, wherein said additional image content includes a logo, text, or a texture; and wherein generating (1032) the composite image includes including at least some additional image content in a corner portion of said composite image not used for an image of a portion of the environment.

Exemplary embodiment 7. The method of exemplary embodiment 5, wherein said encoding (1038) includes: using (1040) an ultra-high-definition television encoder (248) to encode said composite image.

Exemplary embodiment 8. The method of exemplary embodiment 5, further comprising: receiving (1024) a camera selection control signal (249), said camera selection control signal (249) indicating at least which camera (210, 216, 218, 220, 222) is to be used as the source of the third image.

Exemplary embodiment 9. The method of exemplary embodiment 5, wherein said camera selection control signal (249) specifies: i) a stereoscopic camera pair (206 or 212) to be used as the source of said third image and a fourth image or ii) two different mono-scopic cameras (218, 220) to be used as the source of the third and fourth images.

Exemplary embodiment 10. The method of exemplary embodiment 1, wherein said composite image includes a captured environmental image area (504) and additional image area (502); and wherein generating (1032) the composite image includes inserting (1036) into the additional image area (502) additional image content (506, 508 or 510) which was not captured by said first camera.

Exemplary embodiment 11. The method of exemplary embodiment 1, further comprising: generating (1006) said additional image content information, said additional image content information including control information that controls use of the additional image content during rendering of an image using image data included in the composite frame.

Exemplary embodiment 12. The method of exemplary embodiment 11, wherein said additional image content information includes (1008) information indicating a mapping between a first additional image content segment and a segment of an environmental mesh to which the first additional image content segment corresponds, said environmental mesh being used for rendering images.

Exemplary embodiment 13. The method of exemplary embodiment 12, wherein said additional image content information (260) further includes (1010) information indicating conditions when the additional image content segment is to be applied to the segment of the environmental mesh to which it maps during rendering.

Exemplary embodiment 14. The method of exemplary embodiment 13, where said additional image content information (260) further includes (1012): information indicating whether the additional image content is to be mapped onto the segment of the environmental mesh to which it corresponds indicates i) that the mapping is to be without blending with other image content or ii) that the mapping is to be performed with blending with other image content when being mapped onto the segment of the environmental mesh to which the additional image content corresponds.

Exemplary embodiment 15. The method of exemplary embodiment 14, where information indicating whether the additional image content that the mapping is to be performed with blending with other image content when being mapped onto the segment of the environmental mesh to which the additional image content corresponds and wherein the information includes (1014) an alpha value indicating the relative transparency of the additional image content to be applied when combining with the other image content.

Exemplary embodiment 16. A system (200) comprising: a receiver (211 or 245) for receiving a first image captured by a first camera (203) using a first fish eye lens (2); and a compositor (246) for generating (1032) a composite image by combining a portion of the first image with additional image content; and an encoder (248) configured to: i) receive the composite image and additional image content information; and ii) generate encoded content including a first encoded composite frame and said additional image content information.

Exemplary embodiment 17. The system (200) of exemplary embodiment 16, wherein said additional image content information (260) includes control information which controls use of the additional image content by a playback device during rendering of an image.

Exemplary embodiment 18. The system of exemplary embodiment 17, wherein said additional image content information (260) is communicated as metadata.

Exemplary embodiment 19. The system (200) of exemplary embodiment 16, wherein said first camera is a first camera (203) of a stereoscopic camera pair (202) including said first camera (203) and a second camera (204) including a second fish eye lens (3), said receiver (211 or 245) is further configured to: receive a second image captured by the second camera (204) using the second fish eye lens (3); and wherein the compositor (246) is configured to generate (1032) a composite image by combining said first and second images with said additional image content.

Exemplary embodiment 20. The system (200) of exemplary embodiment 16, wherein said encoder (248) is an ultra-high-definition television encoder configured to encode a composite image as a single frame, said composite image including four images of portions of the environment and said additional image content.

Exemplary embodiment 21. The system (200) of exemplary embodiment 16, further comprising: a processor (240) configured to generate said additional image content information, said additional image content information including information indicating a mapping between a first additional image content segment of the composite image and a segment of an environmental mesh to which the first additional image content segment correspond, said environmental mesh being used for rendering images.

Exemplary embodiment 22. The system of exemplary embodiment 12, wherein said additional image content information (260) further includes information indicating conditions when one or more additional image content segments are to be applied to corresponding segments of an environmental mesh during image rendering by a playback device.

Exemplary embodiment 23. A non-transitory machine readable medium including processor executable instructions which when executed by a processor of an image processing and content delivery system control the image processing and content delivery system to: receive a first image captured by a first camera (203) using a first fish eye lens (2); and generate (1032) a composite image by combining a portion of the first image with additional image content; and operate an encoder (248) to: i) receive the composite image and additional image content information; and ii) generate encoded content including a first encoded composite frame and said additional image content information.

ADDITIONAL EXEMPLARY NUMBERED EMBODIMENTS

Additional exemplary embodiment 1. A method comprising: receiving (1015) a first pair of images captured by a first stereoscopic camera pair (202), said first pair of images including at least a first image captured by a first camera (204) and a second image captured by a second camera (203), said first camera (204) being a left camera of said first stereoscopic camera pair (202), said second camera (203) being a right camera of said first stereoscopic camera pair (202); receiving (1016) one or more additional images captured by one or more additional cameras (210, 208, 216, 214, 218, 220, 222); generating (1032) a composite image by combining said first and second with at least a third image to form a composite image, said third image being one of said one or more additional images; and encoding (1038) said composite image to generate a first encoded image including image content from said first, second and third images.

Additional exemplary embodiment 2. The method of additional exemplary embodiment 1, wherein said encoding (1038) includes: using (1040) an ultra-high-definition television encoder (248) to encode said composite image.

Additional exemplary embodiment 3. The method of additional exemplary embodiment 1, wherein receiving (1016) one or more additional images includes receiving (1020) a fourth image captured by a fourth camera (208, 214, 218, 220 or 222); and wherein generating (1032) the composite image includes further combining (1034) said fourth image with said first, second and third images to generate the composite image.

Additional exemplary embodiment 3A. The method of additional exemplary embodiment 3, further comprising: receiving (1024) a camera selection control signal, said camera selection control signal indicating at least which camera (210, 216, 218, 220, 222) is to be used as the source of the third image.

Additional exemplary embodiment 3B. The method of additional exemplary embodiment 3A, wherein said camera selection control signal specifies (1026, 1028) a stereoscopic camera pair (206 or 212) to be used as the source of said third and fourth images or two different mono-scopic cameras (218, 220) to be used as the source of the third and fourth images.

Additional exemplary embodiment 3C. The method of additional exemplary embodiment 3B, wherein said third and fourth images are (1026) from third and fourth cameras (210, 208) of a second stereoscopic pair (206).

Additional exemplary embodiment 3D. The method of additional exemplary embodiment 3, wherein said third and fourth images are (1028) from different non-stereoscopic cameras (mono cameras) (218, 220).

Additional exemplary embodiment 4. The method of additional exemplary embodiment 3, wherein said composite image includes captured environmental image areas and additional image areas; and
  wherein generating (1032) the composite image further includes inserting (1036) into an additional image area additional image content which was not captured by any of said first, second, third or fourth cameras.

Additional exemplary embodiment 5. The method of additional exemplary embodiment 4, wherein said additional image content includes (1004) at least one of a logo, texture, sign, or advertisement.

Additional exemplary embodiment 6. The method of additional exemplary embodiment 5, further comprising: generating (1006) additional image content information which controls use of the additional image content during rendering of an image using image data included in the composite frame.

Additional exemplary embodiment 7. The method of additional exemplary embodiment 6, wherein said additional image content information includes information indicating a mapping between a first additional image content segment and a segment of an environmental mesh to which the first additional image content segment corresponds, said environmental mesh being used for rendering images.

Additional exemplary embodiment 8. The method of additional exemplary embodiment 7, wherein said additional image content information further includes information indicating conditions when the additional image content segment is to be applied to the segment of the environmental mesh to which it maps during rendering.

Additional exemplary embodiment 9. The method of additional exemplary embodiment 8, where said additional image content information further includes: information indicating whether the additional image content is to be mapped onto the segment of the environmental mesh to which it corresponds indicates i) that the mapping is to be without blending with other image content or ii) that the mapping is to be performed with blending with other image content when being mapped onto the segment of the environmental mesh to which the additional image content corresponds.

Additional exemplary embodiment 10. The method of additional exemplary embodiment 9, where information indicating whether the additional image content that the mapping is to be performed with blending with other image content when being mapped onto the segment of the environmental mesh to which the additional image content corresponds and wherein the information includes (1014) an alpha value indicating the relative transparency of the additional image content to be applied when combining with the other image content.

Additional exemplary embodiment 11. A system (200) comprising: a receiver (211) for receiving a first pair of images captured by a first stereoscopic camera pair (202), said first pair of images including at least a first image captured by a first camera (204) and a second image captured by a second camera (203), said first camera (204) being a left camera of said first stereoscopic camera pair (202), said second camera (203) being a right camera of said first stereoscopic camera pair (202) and for receiving one or more additional images captured by one or more additional cameras (208, 209, 214, 216, 218, 220, 222); an image processing system (104) configured to generate a composite image by combining said first and second with at least a third image to form a composite image, said third image being one of said one or more additional images; and an encoder (248) configured to encode said composite image to generate a first encoded image including image content from said first, second and third images.

Additional exemplary embodiment 12. A method of communicating image content corresponding to an environment to a playback device (122), the method comprising: including (1104) a portion of an image of an environment captured by a camera (204 or 203) with a fish eye lens in a frame; including (1106) in said frame a logo, text, or a texture in a corner portion of said frame not used for said portion of the image of the environment.

Additional exemplary embodiment 13. The method of additional exemplary embodiment 12, wherein said frame is a UHD frame in which a portion of a first image captured by a first camera (204) of a first stereoscopic camera pair (202) and a portion of a second image captured by a second camera (203) of said first stereoscopic camera pair (202) is included.

Additional exemplary embodiment 14 The method of additional exemplary embodiment 13, further comprising:

including (1108) in said UHD frame first and second images captured by first and second cameras ((216, 214), or (216, 214) of a second stereoscopic camera pair (206 or 212).

Additional exemplary embodiment 15. The method of additional exemplary embodiment 13, further comprising: including (1110) in said UHD frame an image captured by a mono camera (218, 220 or 222) which is not a member of a stereoscopic camera pair (202, 206, 212).

Additional exemplary embodiment 16. The method of additional exemplary embodiment 15, further comprising: using (1112) an UHD video encoder (248) to encode said frame; and transmitting (1114) said encoded frame to a playback device (122) for use as a texture on a surface of a model of said environment.

Additional exemplary embodiment 17. A method of communicating image content corresponding to an environment to a playback device (122), the method comprising: combining (1206) image content including first and second images from at least two different stereoscopic camera pairs (202, 206) into a UHD frame for transmission; and communicating (1208) the UHD frame to another device (122).

Additional exemplary embodiment 18. The method of additional exemplary embodiment 17, further comprising: receiving (1204) at a device (247) which performs said combining a control signal (249) indicating which of a plurality of different stereoscopic camera pairs (202, 206, 210) are to provide the images to be combined, the output of different stereoscopic pairs being combined into a frame at different times based on said control signal (249).

Some embodiments are directed a non-transitory computer readable medium embodying a set of software instructions, e.g., computer executable instructions, for controlling a computer or other device to encode and compresses stereoscopic video. Other embodiments are embodiments are directed a computer readable medium embodying a set of software instructions, e.g., computer executable instructions, for controlling a computer or other device to decode and decompresses video on the player end. While encoding and compression are mentioned as possible separate operations, it should be appreciated that encoding may be used to perform compression and thus encoding may, in some include compression. Similarly, decoding may involve decompression.

The techniques of various embodiments may be implemented using software, hardware and/or a combination of software and hardware. Various embodiments are directed to apparatus, e.g., a image data processing system. Various embodiments are also directed to methods, e.g., a method of processing image data. Various embodiments are also directed to a non-transitory machine, e.g., computer, readable medium, e.g., ROM, RAM, CDs, hard discs, etc., which include machine readable instructions for controlling a machine to implement one or more steps of a method.

Various features of the present invention are implemented using modules. Such modules may, and in some embodiments are, implemented as software modules. In other embodiments the modules are implemented in hardware. In still other embodiments the modules are implemented using a combination of software and hardware. In some embodiments the modules are implemented as individual circuits with each module being implemented as a circuit for performing the function to which the module corresponds. A wide variety of embodiments are contemplated including some embodiments where different modules are implemented differently, e.g., some in hardware, some in software, and some using a combination of hardware and software. It should also be noted that routines and/or subroutines, or some of the steps performed by such routines, may be implemented in dedicated hardware as opposed to software executed on a general purpose processor. Such embodiments remain within the scope of the present invention. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods. Accordingly, among other things, the present invention is directed to a machine-readable medium including machine executable instructions for causing a machine, e.g., processor and associated hardware, to perform one or more of the steps of the above-described method(s).

In some embodiments each of the steps of the described method is performed by a processor or under the control of a processor. Various features address technical problems of how to encode and/or communicate video of a communications network such as the Internet. Various features also address how to use the limited space of a frame to communicate an image of a portion of an environment along with other content such as a logo, text, or a texture that was not in the environment but maybe combined during rendering with an image of an environment.

Numerous additional variations on the methods and apparatus of the various embodiments described above will be apparent to those skilled in the art in view of the above description. Such variations are to be considered within the scope.

What is claimed:

1. A method comprising:
receiving a first content captured by a first camera using a first fish-eye lens;
receiving a second image content captured by a second camera using a second fish-eye lens;
generating a composite image that includes the first image content by placing additional image content in the composite image at a location outside of an image area used to communicate the first image content;
generating additional image content information that includes an instruction to alter the first image content and the second image content to include the additional image content;
generating encoded content that includes the composite image, the second image content, and the additional image content information; and
outputting the encoded content for transmittal to a playback device for generating stereoscopic image content in accordance with the instruction.

2. The method of claim 1, wherein the additional image content information is communicated as metadata.

3. The method of claim 1, wherein the composite image includes the second image content.

4. The method of claim 3, further comprising:
receiving a third image content,
wherein generating a composite image comprises combining the first image content and the second image content with the third image content.

5. The method of claim 1, wherein:
the additional image content includes a logo, text, or a texture; and
generating the composite image comprises including at least some additional image content in a corner portion of the composite image not used for an image of a portion of an environment.

6. The method of claim 5, wherein the instruction indicates how additional image content included in the composite image is to be blended with the first image content and the second image content.

7. The method of claim 4, further comprising:
receiving a camera selection control signal, the camera selection control signal indicating at least which camera is to be used as the source of the third image content.

8. The method of claim 7, wherein the camera selection control signal specifies: i) a stereoscopic camera pair to be used as the source of the third image content and a fourth image content or ii) two different mono-scopic cameras to be used as the source of the third image content and the fourth image content.

9. The method of claim 1, wherein:
the composite image includes a captured environmental image area and additional image area; and
generating the composite image includes inserting additional image content that was not captured by the first camera into the additional image area.

10. The method of claim 1, wherein the instruction is to map the additional image content to a segment of an environmental mesh used for rendering the first image content and the second image content.

11. The method of claim 10, wherein the instruction includes conditions during which to map the additional image content to the segment of the environmental mesh.

12. The method of claim 11, where the instruction indicates that the additional image content is to be blended with the first image content and the second image content and mapped onto the segment of the environmental mesh.

13. The method of claim 12, wherein the additional image content information includes an alpha value indicating the relative transparency of the additional image content to be applied when the additional image content is blended with the first image content and the second image content.

14. A system comprising:
a receiver for receiving a first image content captured by a first camera using a first fish-eye lens and a second image content captured by a second camera using a second fish-eye lens; and
a compositor for generating a composite image that includes the first image content by placing additional image content in the composite image at a location outside of an image area used to communicate the first image content; and
a processor configured to generate additional image content information that includes an instruction to alter the first image content and the second image content to include the additional image content;
an encoder configured to generate encoded content that includes the composite image, the second image content, and the additional image content information; and
a network interface for outputting the encoded content for transmittal to a playback device for generating stereoscopic image content in accordance with the instruction.

15. The system of claim 14, wherein the additional image content information is communicated as metadata.

16. The system of claim 14, wherein the composite image includes the second image content.

17. The system of claim 14, wherein the encoder is an ultra-high-definition television encoder configured to encode a composite image as a single frame, the composite image including four images of portions of an environment and the additional image content.

18. The system of claim 14, wherein the instruction indicates that the additional image content included in the composite image is to be blended with the captured image content and the second image content.

19. The system of claim 18, wherein the additional image content information includes an alpha value indicating the relative transparency of the additional image content for blending the additional image content with the first image content and the second image content.

20. A non-transitory machine readable medium including processor executable instructions that, when executed by a processor of an image processing and content delivery system, control the image processing and content delivery system to:
receive a first image content captured by a first camera using a first fish-eye lens;
receive a second image content captured by a second camera using a second fish-eye lens;
generate a composite image that includes the first image content by placing the additional image content in the composite image at a location outside of an image area used to communicate the first image content;
generate additional image content information that includes an instruction to alter the first image content and the second image content to include the additional image content;
generate encoded content that includes the composite image, the second image content, and the additional image content information; and
output the encoded content for transmittal to a playback device for generating stereoscopic image content in accordance with the instruction.

* * * * *